(12) United States Patent
Jaini et al.

(10) Patent No.: US 9,967,628 B2
(45) Date of Patent: *May 8, 2018

(54) RATING VIDEOS BASED ON PARENTAL FEEDBACK

(71) Applicant: Google Inc., Mountain View, CA (US)

(72) Inventors: Shiva Jaini, Santa Clara, CA (US); Kevin Dame, San Francisco, CA (US); Bosun Adeoti, Mountain View, CA (US); Charles Thomas Curry, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/595,849

(22) Filed: May 15, 2017

(65) Prior Publication Data

US 2017/0251263 A1    Aug. 31, 2017

Related U.S. Application Data

(63) Continuation of application No. 14/675,114, filed on Mar. 31, 2015, now Pat. No. 9,674,579.

(Continued)

(51) Int. Cl.
*H04N 7/16* (2011.01)
*H04H 60/32* (2008.01)
(Continued)

(52) U.S. Cl.
CPC ..... *H04N 21/4756* (2013.01); *H04N 21/4532* (2013.01); *H04N 21/4667* (2013.01); *H04N 21/4668* (2013.01); *H04N 21/4751* (2013.01)

(58) Field of Classification Search
CPC .......... H04N 21/4532; H04N 21/4667; H04N 21/4668; H04N 21/4751; H04N 21/4756
(Continued)

(56) References Cited

U.S. PATENT DOCUMENTS 8,843,953 B1 *  9/2014  Dang ............... H04N 21/44204
                                                        725/28
8,850,469 B1     9/2014  Yang
(Continued)

FOREIGN PATENT DOCUMENTS

WO    WO 2013138743 A1 *  9/2013   ......... H04N 21/4542

OTHER PUBLICATIONS

Family Reviews+ Ratings, Fandango.com, http://www.fandango.com/intothewoods_168011/familyreviews, Last accessed Apr. 22, 2015, 10 pages.
(Continued)

*Primary Examiner* — Ricky Chin
*Assistant Examiner* — Jaycee Imperial
(74) *Attorney, Agent, or Firm* — Lowenstein Sandler LLP

(57) ABSTRACT

Systems and methods for rating videos based on parental feedback axe presented. In an aspect, a method is provided that includes providing supervisory users respectively having a supervisory role over other users access to watch histories of respective ones of the other users and receiving feedback from the supervisory users regarding appropriateness of a video for the other users, respectively. The method further includes determining an age rating for the media item based on an average age of the other users that the feedback indicates the video is appropriate for, and recommending the video to a user for watching based on the user having an age that satisfies the age rating.

15 Claims, 13 Drawing Sheets

Related U.S. Application Data

(60) Provisional application No. 61/972,849, filed on Mar. 31, 2014.

(51) Int. Cl.
*G06F 3/00* (2006.01)
*G06F 13/00* (2006.01)
*H04N 5/445* (2011.01)
*H04N 21/475* (2011.01)
*H04N 21/466* (2011.01)
*H04N 21/45* (2011.01)

(58) Field of Classification Search
USPC .......................................................... 725/28
See application file for complete search history.

(56) References Cited

U.S. PATENT DOCUMENTS

| | | | | |
|---|---|---|---|---|
| 2004/0073918 | A1* | 4/2004 | Ferman | H04H 60/46 725/34 |
| 2006/0271997 | A1* | 11/2006 | Jacoby | H04N 7/17318 725/135 |
| 2008/0040748 | A1* | 2/2008 | Miyaki | G11B 27/036 725/46 |
| 2009/0133059 | A1* | 5/2009 | Gibbs | G06F 17/30038 725/34 |
| 2010/0071000 | A1* | 3/2010 | Amento | H04N 7/173 725/39 |
| 2011/0179436 | A1 | 7/2011 | Candelore | |
| 2012/0023534 | A1 | 1/2012 | Dasilva et al. | |
| 2013/0060648 | A1* | 3/2013 | Maskatia | G06Q 30/02 705/22 |
| 2014/0007150 | A1* | 1/2014 | Bhide | H04N 21/454 725/14 |
| 2014/0359124 | A1 | 12/2014 | Adimatyam et al. | |
| 2015/0082335 | A1* | 3/2015 | Cobb | H04N 21/4542 725/28 |
| 2015/0249864 | A1* | 9/2015 | Tang | H04N 21/4661 725/28 |

OTHER PUBLICATIONS

Zite FAQ, Zite.com, http://www.fandango.com/intothewoods_168011/familyreviews, Last accessed Apr. 22, 2015, 11 pages.

* cited by examiner

RATING VIDEOS BASED ON PARENTAL FEEDBACK

PRIORITY CLAIM

This application is a continuation of U.S. patent application Ser. No. 14/675,114, filed or Mar. 31, 2015, which claims the benefit of U.S. Provisional Patent Application No. 61/972,849 filed on Mar. 31, 2014. Each application is incorporated by reference herein.

TECHNICAL FIELD

This application generally relates to systems and methods for rating videos based on parental feedback regarding the videos.

BACKGROUND

Conventionally, broadcast media has been provided by television or cable channels that are typically provided, by a relatively small number of content providers. Broadcast media is rated for appropriateness for certain audiences based on various governmental standards. For example, the United States employs rating and classification standards in accordance with, the Motion Picture Association of America (MPAA). The MPAA rating and classification system classifies videos with a rating of G where the video is considered, appropriate for general audiences, a rating of PG where parental guidance is suggested, a rating of PG-13 where some material is considered inappropriate for children under the age of 13, and a rating of R where children under the age of 17 should be accompanied by a parent or guardian. The standards implemented by broadcast media are designed to capture the general opinion of the populous. Video ratings are needed to facilitate parents with monitoring their children's safety and well being in association with viewing media content.

With the ubiquitous nature of media creation and publishing tools, individuals are able to become prolific content creators. This has resulted in the exponential growth of available streaming content, as well as available channels for streaming content. The proliferation of available streaming content is increasing at exponential levels that will soon reach many millions if not billions of available streaming content for viewing. The ability to manually review and provide accurate and meaningful ratings of such large amounts of streaming content is extremely difficult. Accordingly, machine learning systems that analyze video content and associated metadata have been implemented to automatically rate streaming media content. However these machine learning systems generally provide broad ratings that give parents insufficient guidance when monitoring their children's media consumption.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
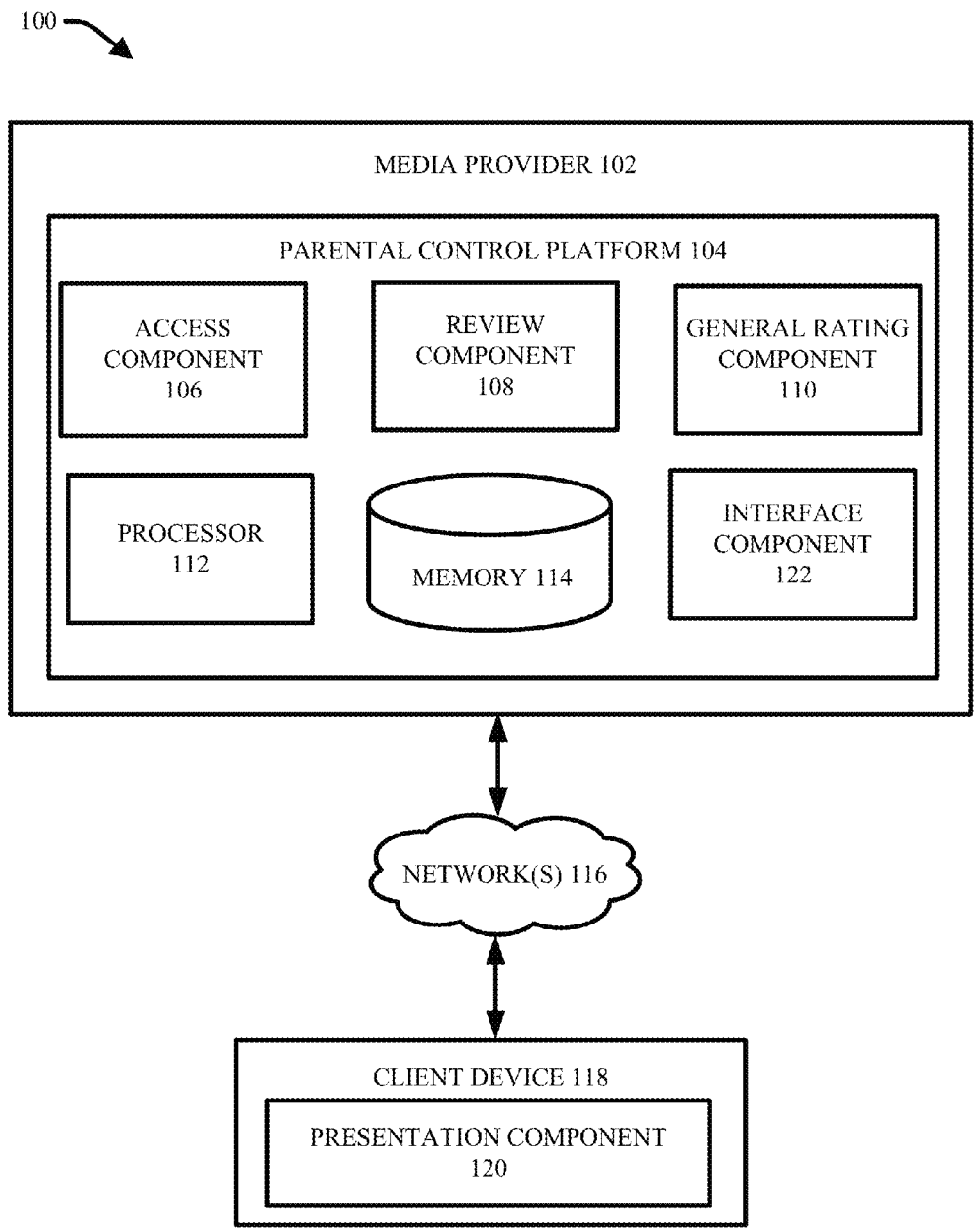
FIG. 1 illustrates an example system for rating media items based on parental feedback in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for rating videos based on parental feedback. In an aspect, a system and user interlace is provided that allows parents to review their children's watch history and provide feedback regarding videos watched by their children. For example, a parent can rate a video viewed by her child and provide feedback regarding her interpretation of appropriateness of the video for her child. The appropriateness can be based on various factors including but not limited to, the child's age, gender, ethnicity, culture, religion, or educational level.

The feedback can vary in descriptiveness. For example, the feedback can include a simple thumbs up indicating the parent considers the video appropriate or thumbs down indicating the parent considers the video inappropriate. In another example, the feedback can include a score that reflects a degree to which the parent considers the video appropriate for her child and whether she would recommend the video to another child similar to her child (e.g., in age, gender, ethnicity, educational level etc.). In yet another example, the feedback can include a detailed analysis of why the parent considers the video appropriate or inappropriate for her child.

In an aspect, the system uses parental feedback to enhance granularity of content ratings. For example, based on feedback from multiple parents regarding appropriateness of a video for children of various ages, the system can associate a rating with the video that reflects a degree of appropriateness of the video for children of a specific age or age range. According to this example, rather than associating a video with a broad rating of G, PG, P-13, or R, the system can specifically indicate an age or age range that the video is appropriate for (e.g., 3-5 years old). The system can also associate statistical information with the video that describes why the video has a certain rating based on data collected and analyzed from the sampled set of parental reviewers. For example, the statistical information can indicate a distribution of the sampled reviewers that consider the video appropriate or inappropriate for a certain age. The statistical information can also group different reviewers by type characteristics and indicate how the different groups rate the video. For example, a group of parents classified as conservative may rate a video differently than a group of parents classified, as liberal.

The disclosed systems facilitate a constant feedback loop where input from parents and their kids age/demographics can be used to train and improve machine learning models for content rating. By crowd sourcing content rating input from parents, a higher degree of content rating personalization can be achieved over automated content rating user audio and video analysis mechanisms. For a specific video, rich information can be gathered that reflects aspects of the video content and characteristics of users that the video is considered appropriate or inappropriate for. As a result, correlations can be established between videos having certain characteristics and children having certain characteristics. This information can not only facilitate rating videos but recommending videos to other users.

It should be appreciated that although aspects of the disclosed subject matter are described with respect to parents reviewing content associated with children (e.g., users under the ages of 18), the disclosed systems and methods are not so limited. In particular, the disclosed techniques can be applied to facilitate content rating and recommendation based on review of the content by any user regarding appropriateness of the content for another user. For example, a professor can review content for appropriateness with respect to his students or a company supervisor can review a workplace instructional video regarding appropriateness of the video for potential employees. Accordingly, where aspects of the disclosed subject matter are described with respect to "parental feedback" of content associated with a child, is should be appreciated that reference to a "parent" and a "child" can encompass user relationships that involve any suitable user having a supervisory role over another user.

In one or more aspects, a system is provided that includes an interface component configured, to provide a user interface that allows a first user to provide feedback regarding endorsement, by the first user, of videos watched by a second user. The system further includes an access component configured to provide the first user access, via the user interface, to a watch history of the second user, wherein the watch history includes one or more videos watched by the second user, a review component configured to receive, in response to input at the user interface, feedback from the first user regarding endorsement, by the first user, of a video included in the watch history of the second user, and a general rating component configured to determine an age rating for the video based on an age of the second user and the feedback. The system further includes a recommendation component configured to recommend the video to a third user for watching based on the age rating and an age of the third user. In various embodiments, the system can also include a personalized rating component configured to determine a personalized rating for the video that reflects a degree of appropriateness of the video for viewing by a third user based on the feedback, a profile of the third user, and a profile of the second user.

In another aspect, a method is disclosed that includes using a processor to execute the following computer executable instructions stored in a memory to perform various acts. These act can include but are not limited to, providing a user interface that allows a first user to provide feedback regarding endorsement, by the first user, of videos watched by a second user, and providing the first user access, via the user interface, to a watch history of the second user, wherein the watch history includes one or more videos watched by the second user. These acts can further include receiving, in response to input at the user interface, feedback from the first user regarding endorsement, by the first user, of a video included in the watch history of the second user, and determining an age rating for the video based on an age of the second user and the feedback.

Further provided is a tangible computer-readable storage medium comprising computer-readable instructions that, in response to execution, cause a computing system to perform various operations. These operations include providing supervisory users respectively having a supervisory role over other users access to watch histories of respective ones of the other users, receiving feedback from the supervisory users regarding appropriateness of a video for the other users, respectively, determining an age rating for the media item based on an average age of the other users that the feedback indicates the video is appropriate for, and recommending the video to a user for watching based on the user having an age that satisfies the age rating.

The subject systems and methods for automatically generating media content ratings provide significant improvements over manual content rating and existing automated machine based media content rating technologies. In particular, one clear advantage with this method is that it allows for higher degree of personalization. Existing machine based content rating systems only allow for personalization to certain age ranges (e.g., 3-5 yrs age). However, the subject systems and methods extend beyond age based personalization to allow for age based personalization on a much more granular level (e.g., 1 yrs, 13 months, 16, months, 8 years and 7 months, 16 years and 1 month, etc.), and personalization on several additional levels pertaining to each individual. For example, rather than receiving a recommendation of a video considered appropriate for a child based solely on his age, the recommendation can be based on appropriateness/suitability for the child based on a variety of other characteristics about the child (e.g., gender, ethnicity, education, family values, religion, language, etc.), and characteristics about the parent of the child (e.g., family values, religion, conservative vs. liberal, etc.).

It is to be appreciated that unlike media recommendation systems that recommend content to users based on a determination that other similar users have accessed or watched the media item and/or that a recommended media item is similar to a previously watched media item, the subject systems and methods determine a personalized suitability/appropriateness rating of a video for a user based on collective or crowd sourced reviews of appropriateness/suitability of the media item for many different users (e.g., children) of associated with a variety of different personal factor combination (e.g., (e.g., different combinations of age, gender, ethnicity, education, family values, religion, language, etc.).

Furthermore, disclosed techniques for generating content rating do not describe an abstract concept, such as a fundamental economic practice, a method of organizing human activity, an idea itself (standing alone), or a mathematical relationship. In contrast, the subject systems and processes are directed to an automated method for generating content ratings for media items that are accessed and watched using an Internet based content delivery platform. In order to obtain information to perform the rating computations, the system requires generation and provision of a user interface that is accessed by an Internet based platform and enables user access to information held on a server device and required for viewing by the users in order for the users to the provide feedback. Further, the system employs the user interface to enable reception of user feedback input and thus enables reception of the information used to perform the rating computations. As can be appreciated by those skilled in the art as well as those unskilled in the art, the above described concepts are inextricably rooted in Internet based computer technology in order to overcome a problem (e.g., automatically determining media content appropriateness ratings) specifically arising in the realm of computer networks (e.g., providing accurate and meaningful ratings of the constant and exponential influx of media content that is being made available for streaming via the Internet).

Referring now to the drawings, with reference initially to FIG. 1, presented is diagram of an example system 100 for rating content based on parental feedback, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the options described.

System 100 includes media provider 102, client device 118 and one or more networks 116 for connecting media provider 102 and client device 118. Media provider 102 can include an entity configured to provide streaming media (e.g., video or audio) to a client device 118 via a network 116. Media provider 102 includes parental control platform 104 to facilitate enabling users to provide feedback regarding appropriateness of media content for another user. For example, parental control platform 104 can allow a first user to rate (or describe) a video (or a song, a channel, an animation, etc.) regarding how the first user personally considers the video appropriate or inappropriate for another user (e.g., a specifically Identified real user or a hypothetical user), based on the other one or more characteristics of the other user. Such characteristics can include but are not limited to, the other user's, age, gender, ethnicity, religion, culture, educational level, subject matter expertise, occupation, preferences, interests, location or context.

Parental control platform 104 can include memory 114 for storing computer executable components and instructions. Parental control platform 104 can further include a processor 112 to facilitate operation of the instructions (e.g., computer executable components and instructions) by parental control platform 104. It is to be appreciated that although parental control platform 104 is illustrated as being a component internal to media provider 102, such implementation is not so limited. For example, parental control platform 104 (and/or one or more components of parental control platform 104) can be included in client device 118, another content server, a cloud, and/or a media player.

Media provider 102 can include art entity that provides media content (e.g., video, streaming video, live streaming video, images, thumbnails or other static representations of video) to a client device 118 via a network 116 (e.g., the Internet). Client device 118 can include presentation component 120 to generate a user interface (e.g., a graphical user interface or virtual interface) that displays media content provided by media provider 102 to a user of the client device. In an aspect presentation component 120 can include an application (e.g., a web browser) for retrieving, presenting and traversing information resources on the World Wide Web. For example, media provider 102 can provide and/or present media content to a client device 118 via a website that can be accessed using a browser of the client device 118. In another example, media provider 102 can provide and/or present media content to a client device 118 via a cellular application platform. According to this application, presentation component 120 can employ a client application version of the media provider that 102 that can access the cellular application platform of media provider 102. In an aspect, the media content can be presented and/or played at client device 118 using a video player associated with media provider 102 and/or client device 118.

As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a play-list including several videos or songs, or a channel including several videos or songs associated with a single media creator.

A channel can be data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

In an aspect, media provider 102 can employ one or more networked computing devices to store media content and deliver media content to users via a network 116. The media content can be stored in memory (e.g., memory 114) associated with media provider 102 and/or at various networked devices employed by media provider 102 and accessed via client device 118 using a web based platform of the media provider 102. For example, media provider 102 can include a media presentation source that has access to a voluminous quantity (and potentially an inexhaustible number) of shared media (e.g., video and/or audio) files. The media presentation source can further stream these media files to one or more users at respective client devices (e.g., client device 118 of the one or more users over a network 116. In another example, media provider 102 can include any entity that provides videos 10 users along with other content and services (e.g., a social networking website that provides social networking services and social videos or an educational website that provides educational videos and services).

Client device 118 can include any suitable computing device associated with a user and configured to interact with media provider 102, and/or parental control platform 104. For example, client device 118 can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that, employs system 100 (or additional systems described in this disclosure) using a client device 118. Network(s) 116 can include wired and wireless networks, including but not limited to, a cellular network, a wide area network (WAD, e.g., the internet), a local area network (LAN), or a personal area network (PAN). For example, client device 118 can communicate with media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

In accordance with one or more embodiments, to facilitate rating media content based on parental feedback, parental control platform 104 can include access component 106, review component 108, interface component 122, and general rating component 110. Access component 106 is configured to provide users associated with a supervisory role (e.g., parents, teacher, etc.) with access to information regarding media consumption, by the users that they supervise. For example, access component 106 can provide parents with access to media watch history or consumption information for their respective children. The respective parents can then review the media that their respective children have watched of have selected for watching. Review component 108 is configured to receive feedback from a plurality of reviewers regarding their endorsement (e.g., their opinions of appropriateness) of media items that the respective other users that have watched, or indicated a desire to watch. For example, the reviewers can include parents that review videos that their children (e.g., the reviewees) have watched or indicated a desire to watch. In another aspect, the feedback provided by the parent/reviewer can generally indicate whether the reviewer considers the video appropriate for the reviewee. In another aspect, the feedback can provide a score (e.g., on a scale from 1 to 10, a ⅔ stars, or another suitable scoring scale) that indicates a level of appropriateness of the video for the reviewee. In some aspects, the review component 108 can request the reviewer to provide feedback regarding appropriateness of the video for the reviewee specifically in view of the reviewer's age or educational level. In other aspects, parental control platform 104 can assume that a review of appropriateness of a video for a child/reviewee provided by a parent/reviewer inherently considers the child's age and/or educational level.

General rating component 110 is configured to determine or inter an age appropriateness rating and/or an educational appropriateness rating to associate with the a media item based on collective reviews received for the media item. For example, general rating component 110 can analyze feedback provided from respective parents of different children regarding appropriateness of the video for the different children, respectively, in view of the respective ages of the different children or the respective educational levels of the different children. Based on the collective feedback, general rating component 110 can determine or infer the most suitable age or age range for which the video is generally considered appropriate and/or the most suitable educational level or range for which the video is generally considered appropriate.

In an exemplary embodiment, access component 106 allows a first user, such as a parent, to access media that has been accessed by or recommended to another user, such as the parent's child. For example, a parent can establish an account with media provider 102 that includes information related to personalized media consumption for the parent and/or the parent's child. The account can provide the parent access to a variety of information associated with the parent's child media consumption via a user interlace provided by interface component 122. For example, the account can allow the parent to review (e.g., watch, watch partially, read a synopsis, read user comments, etc.) videos the child has watched, videos the child has requested to watch, videos that the child has been recommended to watch, videos that the child likes, channels the child has subscribed to, channels, the child has requested to subscribe to, channels the child likes, etc. In an aspect, the account can also include or be associated with profile information for the parent and/or the child that identifies at least a specific age or educational level of the child.

For example, media, provider 102 can employ a networked platform, such as a website or client application, that can be accessed via a network 116 using a client device 118. The website or client application can provide/configure a user interface (e.g., via interface component 122) that facilitates accessing the parent's account, accessing their child's watch history, reviewing media items included in their child's watch history, and providing feedback for videos watched by the user regarding appropriateness of the respective videos for the user. The user interface can be generated presented at the client device 118 via presentation component 120.

According to this embodiment, review component 108 can allow the parent to provide feedback, regarding appropriateness of media content associated with the parent's child. For example, the parent can score a video or channel that has been watched by or requested for watching by the child to reflect a level of appropriateness the parent considers the video or channel for the child. In some aspects, the review component 108 can explicitly request and receive feedback regarding whether the parent considers the video appropriate for the child in general. In another aspect, the review component 108 can request the reviewer provide feedback regarding appropriateness of the video for the child in view of the child's specific age. In yet another aspect, the parent can score a video or channel, that has been watched by or requested for watching by the child to reflect a level of appropriateness the parent considers the video or channel for the child based on the child's specific educational level.

The type feedback provided by a user (e.g., a parent) reviewing a media item for appropriateness of consumption by another user (e.g., the parent's child) can vary. In an aspect, the feedback can include a simple yes or no type response. For example, a parent can provide input that indicates either yes the media item is appropriate for this user (e.g., in consideration of the user's age or educational level), or no the media item is not appropriate for this user. For instance, the parent could select a widget on an interface that indicates "age appropriate" or "not age appropriate." As noted above the specific age or educational level of the child can be determined based on a profile employed by the parent and/or the child. However in other aspects, when providing feedback regarding appropriateness of the media item for his or her child, the parent can indicate the child's specific age or educational level.

In another aspect, feedback regarding appropriateness of a media item for another user can include a score that reflects a level or degree of appropriateness. For example, rather than receiving a yes or no type response, review component 108 can allow the reviewer to score the video (e.g., rate on a scale from 1 to 10 or another suitable scale) with respect to a degree to which the reviewer considers a media item appropriate or inappropriate for another user based on the other users age or educational level. In another aspect, feedback received by review component 108 can also indicate why a reviewer considers content of a media item appropriate or inappropriate for another user.

For example, review component 108 can facilitate reception of more granular parental feedback regarding age appropriateness of a video for his or her child with respect to specific characteristics of the content, such as violence, profanity, lewdness, etc. According to this example, review component 108 can provide the parent with a prompt that allows the parent to indicate whether the parent considers the video appropriate or inappropriate with respect to each characteristic. In an aspect, the prompt can allow the parent to provide an appropriateness score (e.g., rate on a scale from 1 to 10) that reflects a degree to which the parent considers the video appropriate for the child with respect to each characteristic. For example, a parent can rate a video with a score of 2 for violence, 5 for profanity, 1 for lewdness, etc. wherein a higher score indicates a higher degree of inappropriateness (e.g., 1=highly appropriate and 10=highly inappropriate). According to this example, a video can have an overall appropriateness score on a scale of 3 to 30 based on the cumulative scores for each characteristic, wherein a higher score indicates a higher degree of inappropriateness.

With respect to educational videos, a reviewer can indicate that the parent considers the content to have a difficulty level beyond that of her child or below that of her child's educational level Feedback can also include characteristics of another user that the reviewer would consider a media item appropriate or inappropriate for. For example, a reviewer can indicate that a video is appropriate for children between the ages of 6 and 9 or for children who have taken advanced algebra, in addition, feedback received by review component 108 can relate to quality of a media item. In other aspects, feedback received by review component 108 regarding a video watched by another user can reflect how the other user enjoyed the video. For example, a parent can review a video watched by her child and include information in a review that indicates how well the child enjoyed the video.

In various embodiments, interface component 122 is configured to provide a user interface that facilitates accessing user account information, reviewing their children's watch history, and providing feedback regarding videos included in the children's watch history. The interface can be rendered at a client device 118 via presentation component 120. For example, in an aspect, presentation component 120 can include a display and a browser configured to access a website for the media provider and render the interface(s) provided by the website (e.g., via interface component 122). In an aspect, the interface can provide review options for a selected media item included in a child's watch history accessed by the user. For example, the user interface can at least allow a reviewer to view a watch history of another user (e.g., his or her child), select a media item to review that is included in the watch history, and facilitate user input regarding appropriateness of the media item for the other user. For example, the user interface can allow a reviewer to select a widget that indicates the reviewer approves or disapproves of the video for watching by another user based on a characteristic of the other user (e.g., the other user's age). In another example, the user interface can provide the reviewer with a prompt to score the video based on appropriateness of the video for watching by another user.

Figure 2:
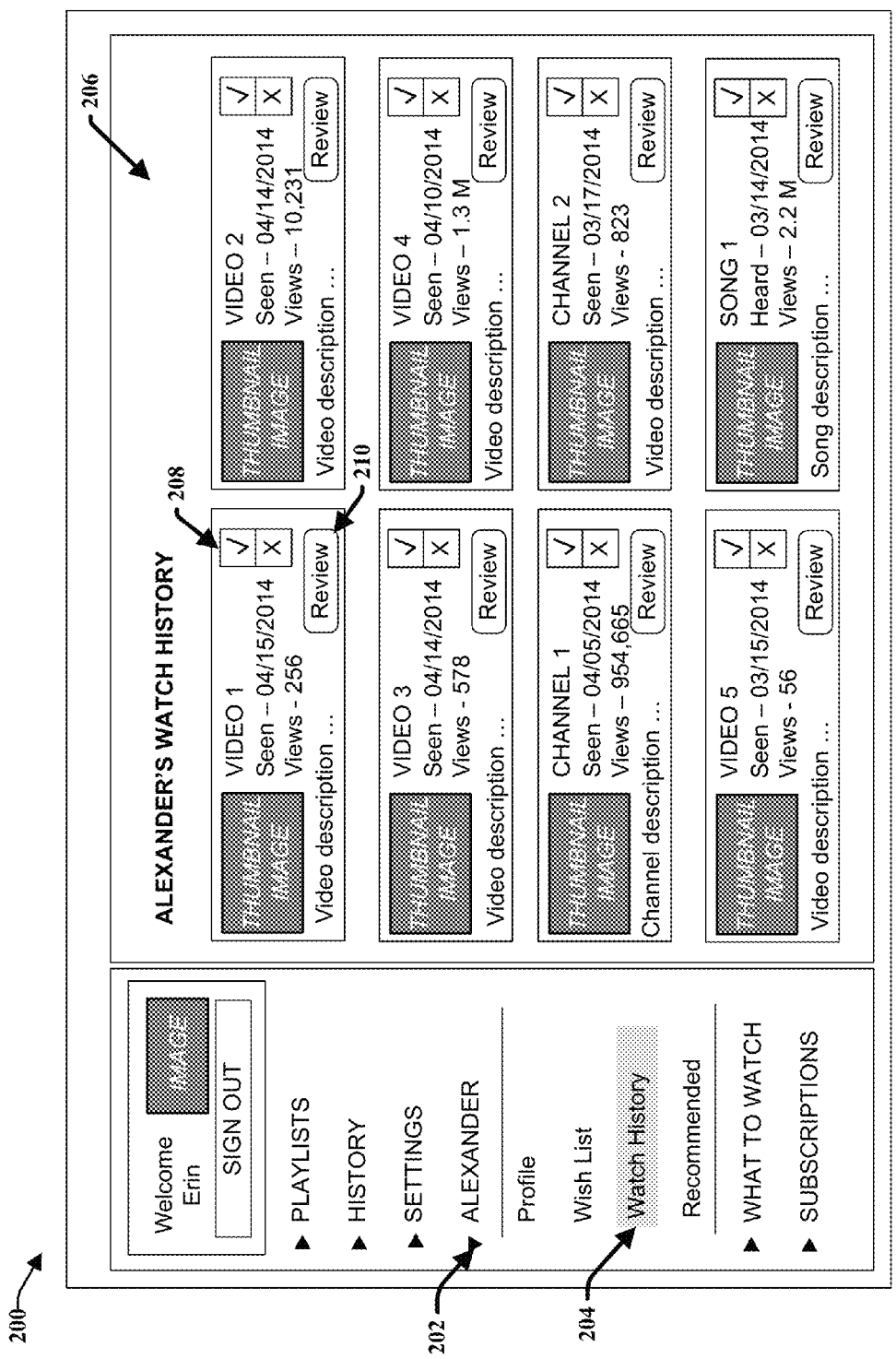
FIG. 2 illustrates an example user interface that facilitates receiving parental review of media items associated with a child of the parent in accordance with various aspects and embodiments described herein.

FIG. 2 depicts an exemplary user interface 200 provided by interface component 122 that facilitates receiving review, by a parent, of media items that have been accessed or may be accessed by a child of the parent. In particular, interface 200 depicts a user account or profile for user "Erin" that facilitates navigating and consuming content provided by a streaming media provider (e.g., media provider 102). In an aspect, the profile allows Erin to tailor and save preferences and information regarding her media consumption at media provider. For example, the left side of the interface can include various menu options that organize access to information regarding media Erin has consumed, media Erin has saved or created, and media that Erin has been recommended and media Erin has subscribed to.

In another aspect, the profile/account allows Erin to monitor and access information regarding media consumption of another user at media provider. In particular, the profile/account can include information that links Erin's profile/account to a profile/account for her child Alexander (e.g., or any other user that is supervised by Erin and/or authorizes Erin access to his or her profile/account). According to this aspect, via her profile/account, Erin can access information that, describes Alexander's media consumption profile via menu option "Alexander" 202 and sub-menu option "profile." Erin can also provide information to describe Alexander via his profile. For example, Erin can describe characteristics of Alexander, such as demographical characteristics (e.g., age, gender, birthday, culture, religion, location, educational level etc.) and preference characteristics (e.g., content Alexander prefers, content inappropriate for Alexander, content appropriate for Alexander, etc.) via his profile.

Via menu option "Alexander" 202, Erin can also navigate to sub-menu options "wish list," "watch history" 204, and "recommended" to view media items associated with the respective sub-menu categories. For example, selection of menu option "wish list" can generate a view of media items that Alexander has marked as liked, favorited, saved, or requested for viewing. Selection of menu option "watch history" 204 can generate a view of media items that Alexander has watched in the past and selection of the menu option "recommended" can generate a view of media items that. Alexander has been recommended for watching by a media content recommendation system employed by the media provider.

Interface 200 further allows Erin to provide feedback regarding media items associated with respective sub-menu options "wish list" "watch history" 204, and "recommended." In particular, Erin can select a media item associated with Alexander's wish list, watch history, or media recommendations and provide feedback for the media item with respect to her endorsement of Alexander's watching of the media item. For example, the feedback can indicate Erin's consideration of appropriateness of the media item for Alexander with respect to his age or educational level. For example, Erin can view a video included in Alexander's wish list that has heavy violence and vulgar music and mark the video as inappropriate for watching by Alexander. In an aspect, such factors for which Erin's basis her interpretation of appropriateness can be inferred. In another aspect the factors can be stated or declared in association with her review (e.g., either by Erin or by review component 108 in accordance with guided review of the video by review component 108).

For example, as seen in interface 200, Erin has selected the "watch history" 204 sub-menu option that results in the display of media items watched by Alexander in section 206. Section 206 can include a list or grid view of various media items (e.g., videos, channels, songs, etc.) watched or listened to by Alexander. Each of the media items can include various information associated therewith, such a thumbnail image representing the respective media items, a title associated with the respective media items, a date noting when Alexander watched the respective media items, number of view associated with the respective media items, and a description of the respective media items. In addition, each, of the media items can be associated with elements that allow Erin to provide feedback regarding her endorsement of watching of the respective media items by Alexander. For example, each of the media items can include an input widget 208 that allows Erin to mark a "check box" to indicate she considers the video appropriate for Alexander or an "X box to indicate she considers the video inappropriate for Alexander.

Each of the media items can also include a review button 210. In an aspect, selection known of a review button 210 associated with a media item can allow Erin to provide a more granular review of the media item. For example, in response to selection of review button 210 for video 1, a review prompt can be generated that allows Erin to input various information regarding appropriateness of video 1 for Alexander. In an aspect, the review prompt can include a survey with various questions related to appropriateness of the video for Alexander. The questions can be responded to via selection of a checkbox, filling in a score or rating, or providing a typographical response. For example, a survey for video 1 can include several questions related to how Erin would rate the video (e.g., on a scale of 1-10) for appropriateness for Alexander with respect to violence, profanity, vulgarity, etc. In another example, a survey for video 1 can include several questions related to how Erin would rate the video (e.g., on a scale of 1-10) for appropriateness for Alexander with respect to each of the following categories; age, gender, ethnicity, religion, educational level, context, language, etc. The survey can also include other questions that could facilitate rating the video or recommending the video to another user. For example, the survey could prompt Erin to indicate characteristics of a hypothetical user (e.g., what age or age range, gender, educational level etc.) she considers the video appropriate for. The survey could also prompt Erin to indicate how she felt Alexander enjoyed the video. It should be appreciated that the various types of information, that can be included and received with a review regarding appropriateness of a video for another user can vary and is not limited to the examples provided herein.

Referring back to FIG. 1, general rating component 110 is configured to determine a general age rating or educational level rating for a media item based on aggregate parental review feedback provided for the media item. In particular, general rating component 110 can analyze parental review feedback for a media item, received from a plurality of parents (or reviewers) regarding appropriateness of the video for a children of various ages and/or educational levels. Based on the feedback, general rating component 110 can determine or infer a rating to associate with the media item that reflects the collective views of the parents regarding appropriateness of the video for a user of a particular age or educational level. For example, general rating component 110 can determine a rating for a video that indicates the video is most appropriate for users between the ages of 3 and 5, between the ages of 14 and 15 or for a particular age such as 18 and above. In another example, general rating component 110 can determine a rating for a video that indicates the video is appropriate for users having an educational grade level of 8.

General rating component 110 can employ various statistical analysis tools to facilitate determining an age or educational rating for a media item. For example, rating component can analyze a large sample of reviews and determine a mean age or age range the reviews consider the media item appropriate for and/or inappropriate for. General rating component 110 can also apply threshold requirements with respect to sample size and sample distribution to facilitate determining or inferring an age or educational rating for a media item. For example, general rating component 110 can require a minimum sample size of N (e.g., where N is a suitable number). In another example, general rating component 110 can require a threshold percentage (e.g., 60%, 70%, 80%, 90%, 95%, etc.) with respect to a percentage of the reviews that consider the media item appropriate for a specific age or age range prior to assigning a rating to the video that declares it appropriate for the specific age or age range. In an aspect if the threshold is not met, general rating component 110 can provide the video to another review system (e.g., a manual review system) to determine an appropriate age or educational rating for the video. The rating component 110 can also continuously analyze and adjust a rating assigned to a video based on new parental feedback.

In an embodiment where reviewers provide feedback with scores of appropriateness of a video for a reviewee in different categories, such as violence, profanity, vulgarity, etc., general rating component 110 can determine a mean or median score for the video in each category based on aggregate feedback. For example, the general rating component can rate a video with an average score of X in violence, an average score of Y in profanity, and an average score of Z in vulgarity with respect to a child of a particular age. According to this embodiment, general rating component 110 determine an age rating for a video that indicates its appropriates for a user of a particular age with respect to violence, profanity and vulgarity.

Figure 3:
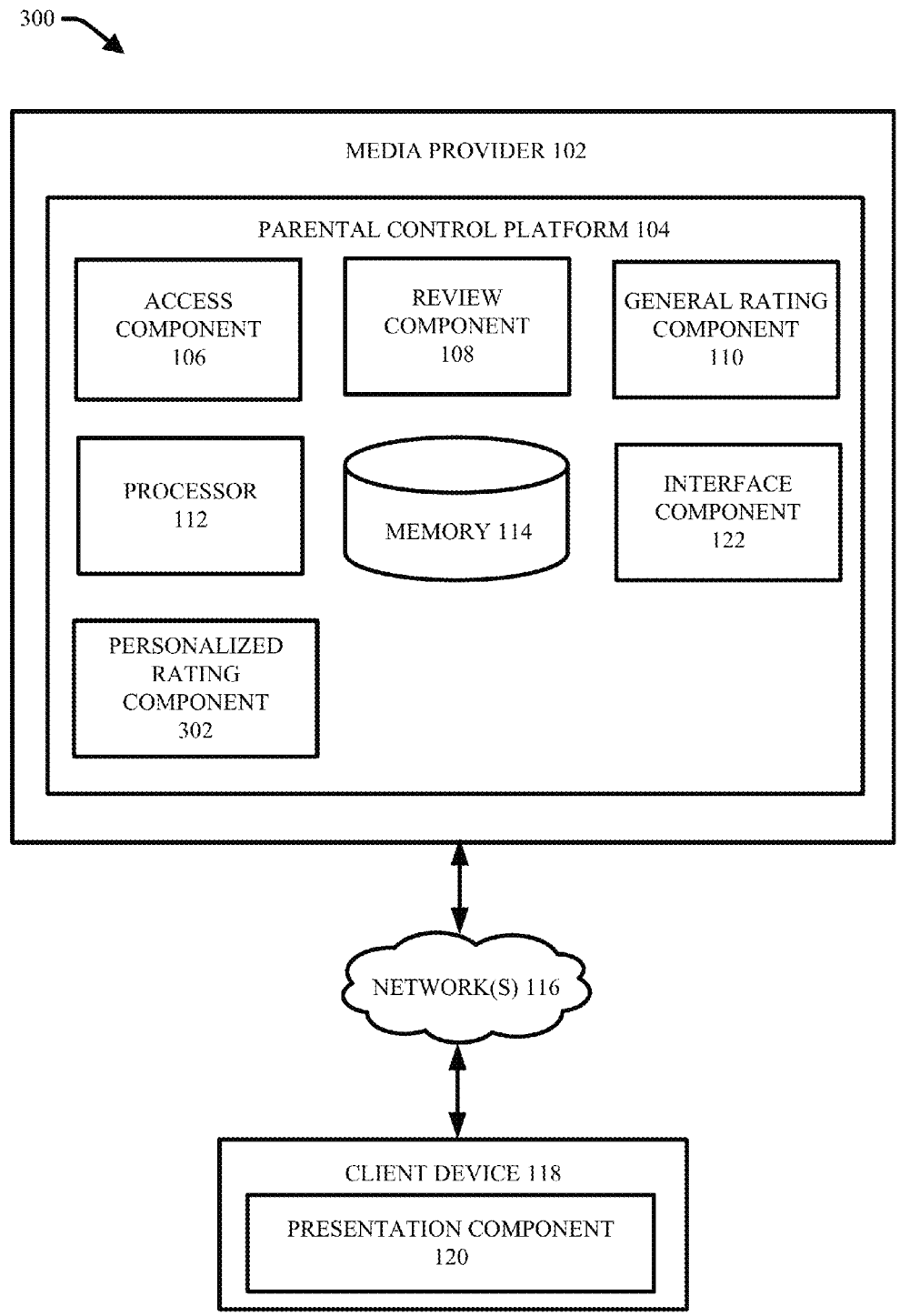
FIG. 3 illustrates another example system for rating media items based on parental feedback in accordance with various aspects and embodiments described herein.

Referring now to FIG. 3, presented is diagram of another example system 300 for rating content based on parental feedback, in accordance with various aspects and embodiments described herein. System 300 includes same or similar features and functionalities as system 100 with the addition of personalized rating component 302 to parental control platform 104. Repetitive description of like elements employed in respective embodiments of systems described herein is omitted for sake of brevity.

Personalized rating component 302 is configured to determine or infer a personalized rating for a media item that reflect a degree of appropriateness of the media for a particular user (e.g., a potential viewer of the video or a hypothetical user having a hypothetical profile) based on personal, characteristics associated with the particular user in addition to the age and/or educational level of the user. For example, a video that one parent considers appropriate for a particular 8 year old child may be considered inappropriate by another parent for another 8 year old child based on a variety of personal characteristics associated with the different children (e.g., age, educational level, gender, religion, etc.) and a variety of personal characteristics associated with the different parents (e.g. the parent's values, age, religion, etc.). Accordingly, in one or more embodiments, personalized rating component 302 is configured to determine a personalized appropriateness rating for a video and a potential viewer of the video based, on the appropriateness feedback provided for the video from a plurality of patents/reviewers, a profile of the potential viewer, profiles of other users for which feedback regarding appropriateness of the video for the respective other users has been received, and/or profiles of the respective reviewers who provided the feedback regarding appropriateness of the video for the respective other users.

In an embodiment, personalized rating component 302 can identify the set of parents/reviewers whom provided appropriateness feedback for a video and the set of children/reviewers, for which the appropriateness feedback was based. Personalized, rating component 302 can further compare profile information for the respective children/reviewees in the set to profile information for the potential viewer to identify a subset of the children/reviewees that have profile information similar to the profile information for the potential viewer. For example, the profile information for a child/reviewee can include information identifying the child's age and/or educational level as well as additional characteristics associated with the child/reviewee. These additional characteristics can include but are not limited to: user gender, user ethnicity, user culture, user religion, user socioeconomic status, user language, or user geographic location.

Accordingly, personalized rating component 302 can identify a subset of the reviewees (for which feedback associated with the video has been received) that are similar to the potential viewer with respect, to one or more of age, educational level, gender, ethnicity, culture, religion, socioeconomic status, language, or geographic location. It should be appreciated that personalized rating component 302 can employ various algorithms that relate two sets of profile characteristics (e.g., one set of a reviewee and another for the potential viewer) with one another to determine a degree of similarity between the sets of profile characteristics. The children/reviewees with profiles exhibiting a threshold degree of similarity to that of the potential viewer can be included in the subset.

In an aspect, after personalized rating component 302 has identified the subset of children/reviewees that share similar profile information with the potential viewer, the personalized rating component 302 can analyze the appropriateness feedback respectively provided for the children/reviewees included in the subset. In particular, the personalized rating component 302 can analyze appropriateness feedback for a video provided for children similar to the potential child viewer to determine a rating for indicative of appropriateness of the video for the potential child viewer.

In another embodiment, personalized rating component 302 can compare profile information for a supervisor (e.g., a parent) of a potential viewer with profile information for the respective reviewers that provided appropriateness feedback for the video. For example, profile information associated with a parent/reviewer can include the parent's age, gender, relationship status, geographic location, language, occupation, educational level, socio economic status, ethnicity, culture, religion, political values, child rearing values, number and age of children, and/or other types of characteristics preferences regarding types of content the parent considers appropriate and/or inappropriate for the child. According to this embodiment, personalized rating component 302 can identify a subset of the reviewers/parents that have similar profile information (e.g., values, religion, ethnicity, geographic location, etc.) as the parent/supervisor of the potential viewer of the video. The personalized rating component 302 can then analyze feedback provided by only those re-viewers/parents included in the subset when determining or inferring an appropriateness rating for the video and the potential viewer. As a result, the personalized rating for the video and the potential viewer will reflect opinions of other parents that have similar values and other characteristics as the parent-supervisor of the potential viewer.

Still in yet another embodiment, personalized rating component 302 can select of subset of feedback received for the video based on comparison of profile information for the potential viewer and profile information for the respective reviewees for which the feedback was based, and based on comparison of profile information for the parent/supervisor of the potential reviewer and the profile information for the respective reviewers. For example, the personalized rating component 302 can analyze feedback provided by a plurality of parents regarding appropriateness of the video for their respective children and identify a first subset the children that have profile information similar to the profile information for the potential viewer. The personalized rating component 302 can then identify the parents of the children included in first subset and identify a second subset of parents of children included in the first subset that have profile information similar to that of the profile of the parent of the potential viewer. The personalized rating component 302 can then employ the feedback associated with the second subset of parents/children to facilitate determining a personalized rating for the video that reflects its appropriateness for the potential viewer.

After the personalized rating component 302 has identified a subset of feedback for a video based relatedness of the respective reviewees and the potential viewer and/or relatedness of the respective reviewers and the supervisor/parent of the potential viewer, the personalized rating component 302 can determine a personalized rating score for the video and the potential viewer. The personalized rating will reflect a degree of appropriateness of the video for the potential viewer based on the potential viewer's profile and opinions of other users/parents that have reviewed the video for other users similar to the potential viewer and/or the opinions of other users/parents that are similar to the parent/supervisor of the potential viewer.

The form of the personalized rating can vary depending on the form of the feedback received for the video. For example, as discussed supra, the feedback can include an indication of either "yes" this video is appropriate for my child or "no" this video is not appropriate for my child. According to this aspect, the personalized appropriateness rating can include a simple "yes appropriate" or "no inappropriate" based on the majority response. In another example, the appropriateness rating can indicate that X % of the sampled of reviewers indicate the video is appropriate for the potential viewer and Y % of the sampled reviewers indicate the video is inappropriate for the potential viewers. In another aspect, the feedback can include an appropriateness score provided by the respective reviewers (e.g., on a scale of 1 to 10 or another suitable scale). According to this aspect, the personalized rating component 302 can determine a personal rating for the video that is based on an average score of the sampled reviews. Still in yet another aspect, reviewers can provide separate scores regarding appropriateness of a video with respect to violence, profanity, vulgarity, etc. According to this aspect, the personalized rating component 302 can determine a personalized rating for the video that includes an averaged violence score, an averaged profanity score, an averaged vulgarity score, etc, for the sampled feedback.

Profile information for a user, including a reviewer (e.g., a parent), a reviewee (e.g., a child), a potential viewer and a supervisor for the potential viewer can be obtained in various ways. In an aspect, the respective users can provide the information to parental control platform 104. For example, in association with establishment of an account or profile with parental control platform 104 by a parental user, the parent can provide profile information regarding his or her age, gender, ethnicity, religion, language, culture, location, educational level, political values, family values, child rearing techniques, etc. The parent can also provide information regarding his or her child's profile information, such as the child's age, gender, ethnicity, religion, language, culture, location, educational level, etc. In another aspect, the child can provide the profile information in association with establishment of an account with media provider. In another aspect, profile information for a user can be imported from other sources affiliated with parental control platform 104 and or media provider in accordance with permission provided by the user, (e.g., a social networking website at which the user has an account).

Still in yet another aspect, parental control platform 104 can inter profile information to associate with a user based on review of watch history of the user. For example, parental control platform can infer an age, gender, language, geographic region, etc., of a user based on the type of content watched by the user, the location at which the content is watched, the time of day and duration for which the content is watched, and the social affiliations/activity of the user.

In an embodiment, profile information can also include user declared or inferred tolerances to certain characteristics of content. In particular, in association with usage of a review system that allows users to rate videos for appropriateness in different categories, such as violence, profanity, vulgarity, etc., a user can provide information that identifies a tolerance level for his or her child with respect to scores for violence, profanity, vulgarity, etc. For example, a parent can associate information with his or her child profile or his or her child's profile that indicates the videos with a violence score of X or lower are appropriate for the child, videos with a profanity score of Y or lower are appropriate for the child, videos with a vulgarity score of Z or lower are appropriate for the child, etc. Similarly, in association with usage of a review system that employs score values or number (e.g., on a scale of 1-10 or another suitable scale), the parent can declare in profile information for his or her child, an acceptable score for which videos are considered appropriate for his or her child. For example, the user can provide information stating that videos having overall appropriateness scores of N or higher are appropriate for the child.

In an aspect of this embodiment, personalized rating component 302 can alter a rating determined based on the sampled feedback for a video with respect to categories of violence, profanity and vulgarity based on profile information for the potential viewer regarding tolerances to violence, profanity etc. For example, a review for a child having a similar profile as the potential viewer with respect to age, gender, educational level, ethnicity, religion, etc. can have individual scores for a video (e.g., on a scale of 1 to 10) with respect to violence, profanity, and vulgarity. According to this example, the individual scores for the video may be a 7 for violence, a 2 for profanity and a 1 for vulgarity (wherein a higher score reflects a higher degree of inappropriateness), giving the video a total appropriateness score of 10 out of 30 (wherein the lower the score the more appropriate the video). However, profile information for the potential viewer can indicate the potential viewer has a high tolerance to violence (e.g., the potential viewer can tolerate violence scores of 8 or less). Accordingly, personalized rating component 302 can be configured to filter the rating based on the potential viewer's profile information and reduce the score from a 10 to a lower number (e.g., a 3 based on removal of the violence scone component).

Figure 4:
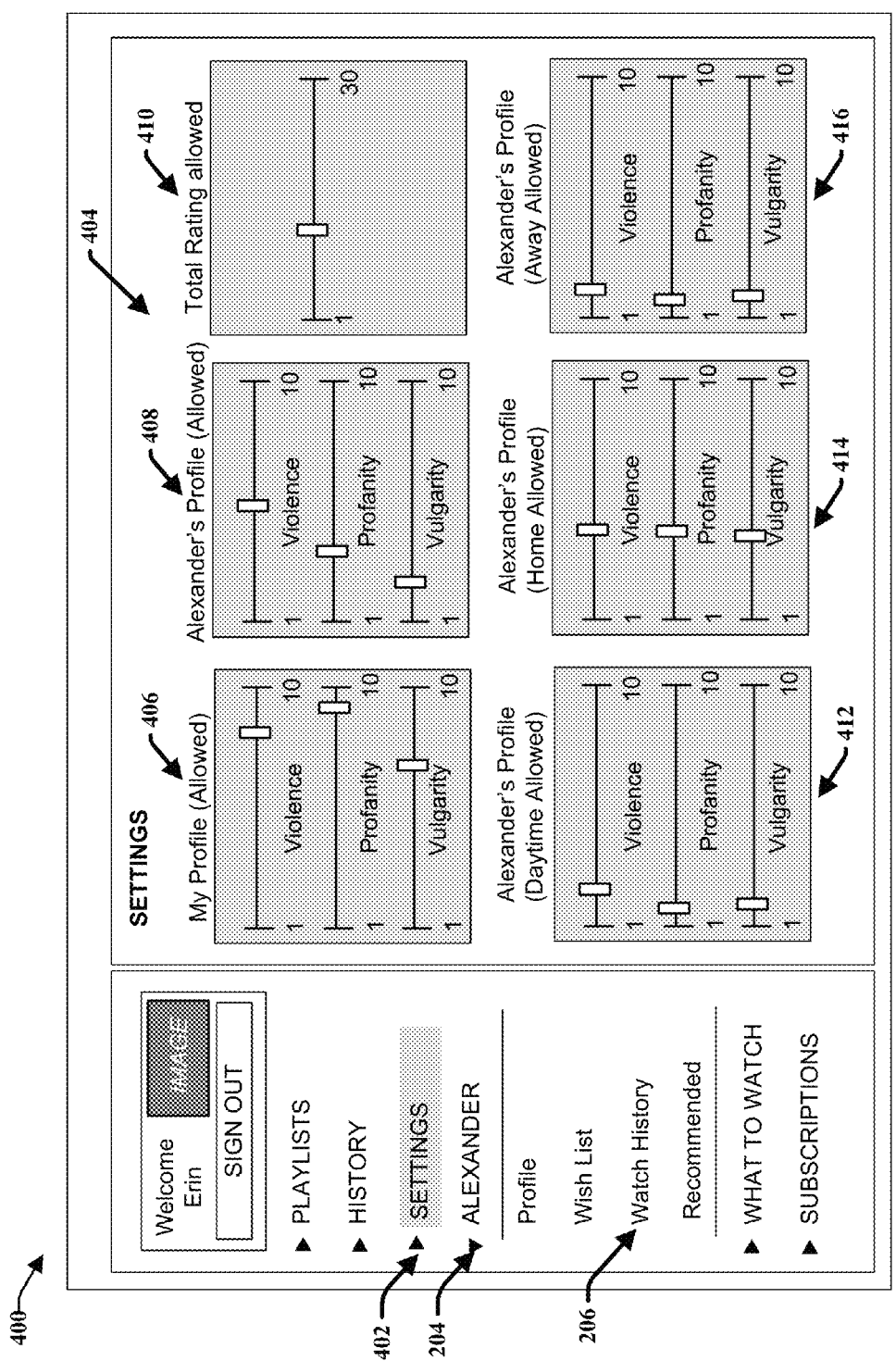
FIG. 4 illustrates another example user interface that facilitates receiving parental review of media items associated with a child of the parent in accordance with various aspects and embodiments described herein.

FIG. 4 depicts an exemplary user interface 400 provided by interface component 122 that facilitates receiving review, by a parent, of media items that have been accessed or may be accessed by a child of the parent. Repetitive description of like elements employed in other embodiments described herein is omitted for sake of brevity.

Interface 400 includes same or similar aspects as interface 200. Interface 400 particularly exemplifies an example interlace that allows a user to control various settings regarding tolerances to content ratings. With interface 400, the user (e.g., Erin), has selected the settings options 402 from the menu bar. In response to selection of the settings option 402, a plurality of controls 406-416 are presented in area 404 that relate to settings, for the parent's profile (Erin) and the parent's child profile (Alexander), of tolerances for content ratings that are preferred for the parent and the child. In an aspect, the initial settings of the various controls 406-416 can be set to a default setting. This default setting can be standard for all users or can account in part for characteristics of the user (e.g., the user's age, demographics, location, etc.).

However, using the various controls 406-416, the Erin can manually select a desired setting. For example, control 406 allows the user (Erin) to select rating thresholds, with respect to violence, profanity, and vulgarity, that the user Erin would like for content that is recommended to the her. Control 408 allows Erin to select rating thresholds, with respect to violence, profanity, and vulgarity, that Erin would like for content that is recommended to the user's child Alexander. Control 410 allows Erin to select rating thresholds, with respect to a total rating score, that the user Erin would like for content that is recommended to the user's childe Alexander. Control 412 allows Erin to select rating thresholds, with respect to violence, profanity, and vulgarity, that Erin would like for content that is recommended to the user's child Alexander during the specific context of daytime. Control 414 allows Erin to select rating thresholds, with respect to violence, profanity, and vulgarity, that Erin would like for content that is recommended to the user's child Alexander during the specific context of being located at home. Control 416 allows Erin to select rating thresholds, with respect to violence, profanity, and vulgarity, that Erin would like for content that is recommended to the user's child Alexander during the specific context of being located away from home.

With reference back to FIG. 3, with personalized rating component 302, feedback provided by a reviewer/parent will inherently reflect attributes of the parent included in the parents profile (e.g., age, gender, ethnicity, religion, language, culture, location, educational, level, political values, family values, child rearing techniques, etc.) as well as attributes of the child for which the parent is reviewing the video (e.g., age, gender, ethnicity, religion, language, culture, location, educational level, etc.). Therefore, by determining a personal appropriateness rating of a video for a potential viewer based on feedback regarding appropriateness of a video for a children similar to the potential viewer and feedback from parent similar to a parent of the potential viewer, the personal appropriateness rating will reflect a degree of appropriateness of the video for the potential viewer based, on various characteristics of the potential viewers profile and various characteristics of a profile of the potential reviewers parent/supervisor.

Figure 5:
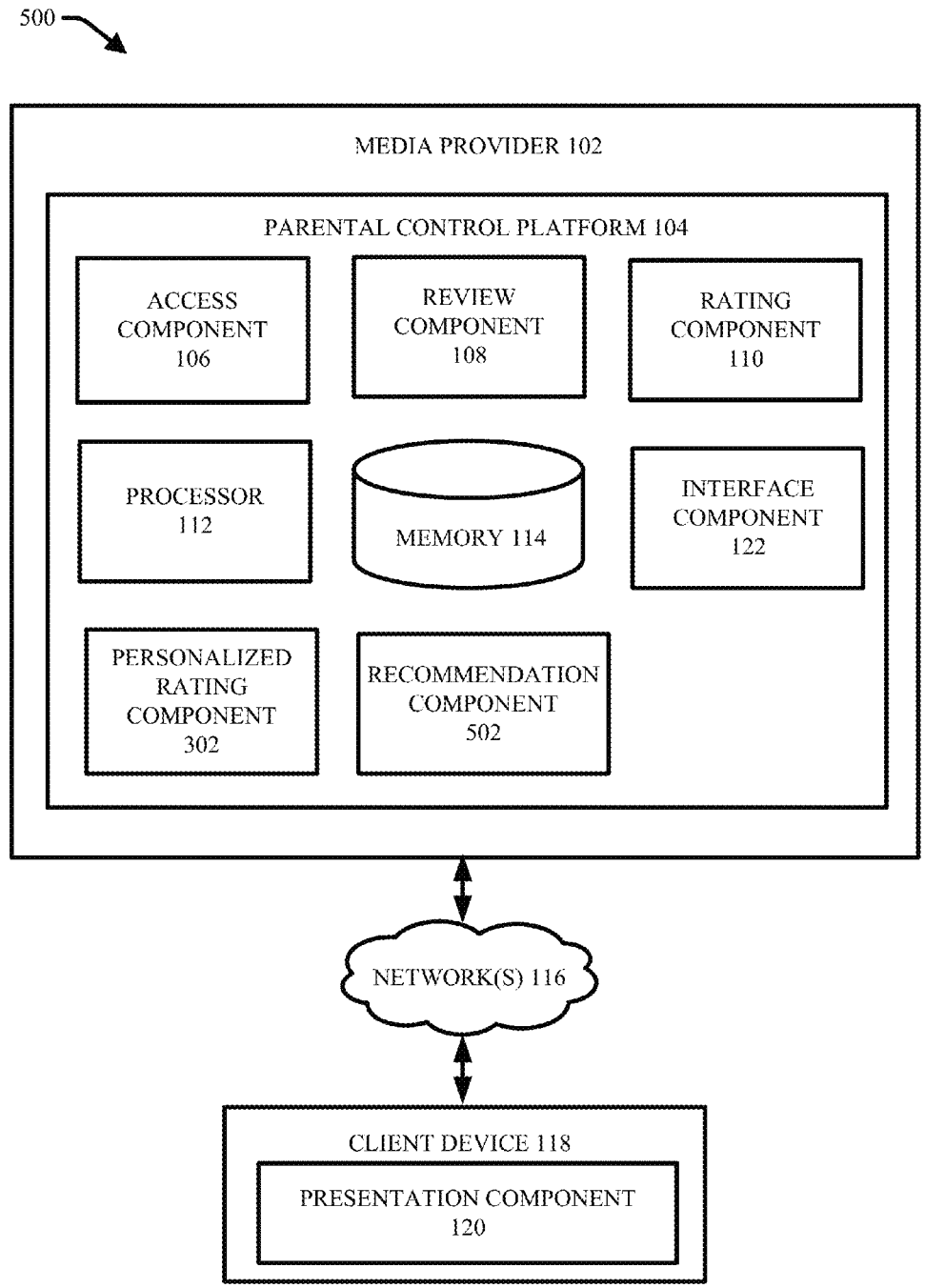
FIG. 5 illustrates another example system for rating media items based on parental feedback in accordance with various aspects and embodiments described herein.
Figure 6:
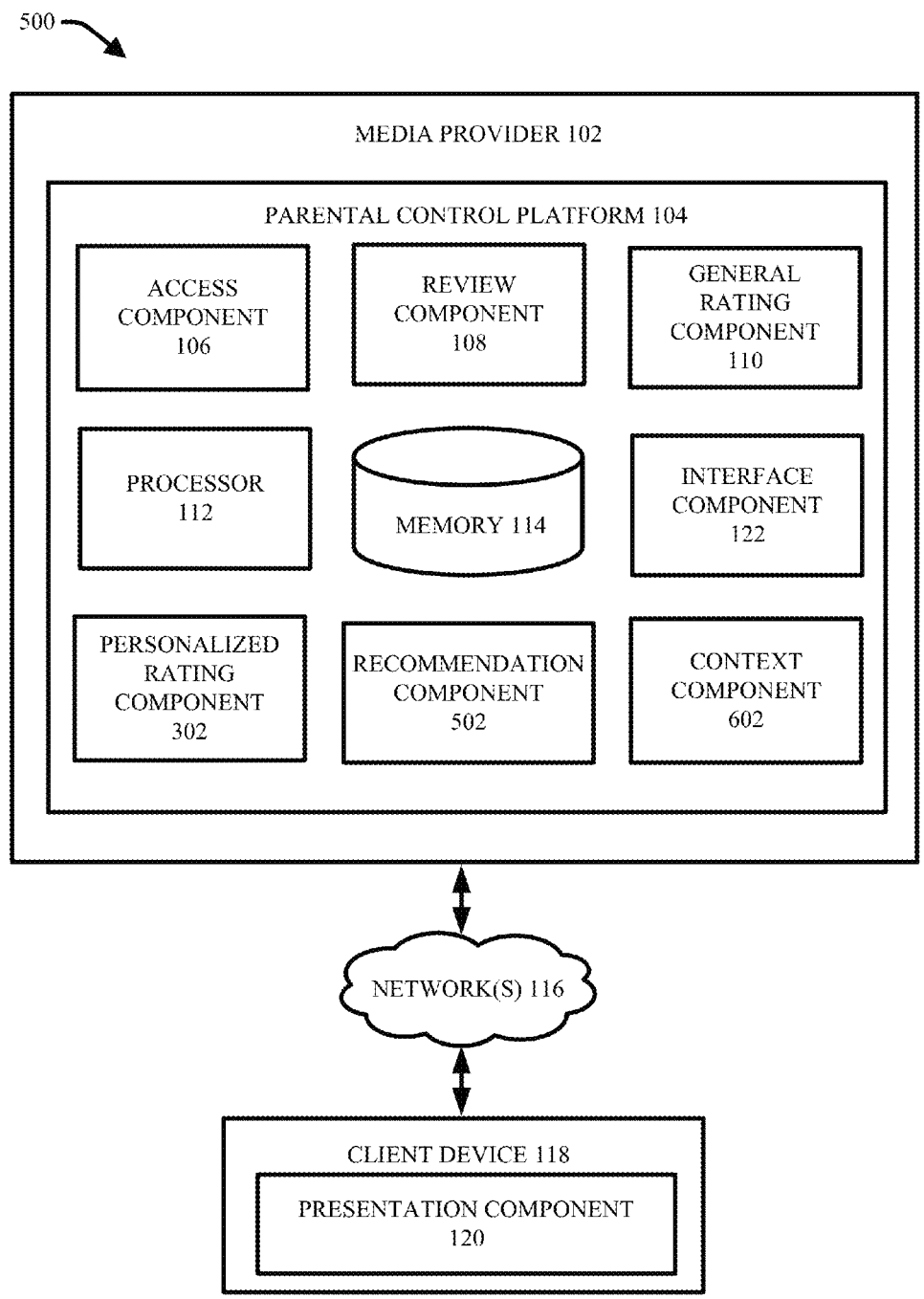
FIG. 6 illustrates another example system for rating media items based on parental feedback in accordance with various aspects and embodiments described herein.

Referring now to FIG. 5, presented is diagram of another example system 400 for rating content based on parental feedback, in accordance with various aspects and embodiments described herein. System 500 includes same or similar features and functionalities as system 100 with the addition of recommendation component 502 to parental control platform 104. Repetitive description of like elements employed in respective embodiments of systems described herein is omitted for sake of brevity.

In one or more embodiments, recommendation component 502 is configured to recommend media items to users based on a general age or educational rating associated with the media item and an age or educational level of the user. In particular, as discussed supra, general rating component 110 can associate a rating with a media item that reflects an age/age range and/or an educational level/range that the media item is considered appropriate for. In turn, recommendation component 502 can recommend the media item to other users that are the age or within the age range, or have the educational level, associated with the rating. For example, where general rating component 110 associates a rating with a video that indicates it is suitable for children between the ages of 3 and 5, recommendation component 502 can recommend the video to users (or parents/supervisors of those users) that are between the ages of 3 and 5.

In one or more other embodiments, recommendation component 502 is configured to identify and recommend media items to a user based on a personalized rating for the user and the media item pair. For example, recommendation component 502 can direct personalized rating component 302 to generate personalized ratings for media items based on the respective media items and the profile of a potential, viewer using the techniques discussed supra with respect to personalized rating component 302. For example, personalized rating component can analyze a set of videos to determine personalized ratings for the videos in the set that reflect a degree of appropriateness of the respective videos for the potential viewer.

In an aspect, recommendation component 502 can initially select the set of videos for which to determine personalized ratings for based on a general rating associated with the videos and an age of the potential viewer. According to this aspect, recommendation component 502 can apply a broad filter against videos provided by media provider to eliminate analysis of those videos for which there is a low confidence level of being considered appropriate for the potential viewer. For example, when the potential viewer is 10 years old, recommendation component 502 can be configured to select, a set of video from a large database of videos that are associated with a general age rating of 10 or within a predefined range with a median of 10 (e.g., between ages 7 and 13). According to this aspect, rather than generating personalized ratings for a particular user and all potential media items provided by media provider 102, personalized rating component 302 can generate personalized rating for a smaller set of videos. It should be appreciate that recommendation component 502 can employ various other filters/minimum thresholds using features associated with a video and a characteristic of a potential viewer to select a set of videos provided by media provider 102 for which to generate personalized ratings. For example, recommendation component 502 can be configured to select videos to include in the set based on a language of the potential viewer, a geographic location of the potential viewer, an educational level of the potential viewer Recommendation component 502 can be configured to recommend the videos in the set that are associated with a personalized rating that, satisfies a recommendation requirement or rating threshold. For example, when the personalized rating is a value, such as either "yes appropriate" or "no inappropriate," recommendation component 502 can be configured to recommend only those videos to the potential viewer that are rated as appropriate. In another example, when the personalized rating is a value such as an appropriateness score (e.g., a score of 5 out of 30, a score of 75% deem the video appropriate, etc.), recommendation component 502 can be configured to recommend the videos having an appropriateness score above a threshold score, in some aspects, the threshold score can be determined by parental control platform 104. In another aspects, the threshold score can be defined by the parent/supervisor of the potential viewer.

In various additional embodiments, recommendation component 502 can enhance the granularity of recommendations based on correlations between multiple user characteristics and media personalized media ratings. For example, recommendation component 502 can determine or infer a character profile (based on a plurality of demographic and/or preference, characteristics of the user and/or the user's parent) that correlates (with respect to appropriateness for viewing) with different media items based on personalized ratings determined for the respective media items and different users. Recommendation component 502 can then recommend the respective media items to another user based on degree of similarity between the other user and the character profile.

For example, in association with determining personalized ratings for a video and user pair, recommendation component 502 can associate the video with a user profile type. For example, recommendation component 502 can determine that a video is suitable for user Tommy who has a profile with characteristics A, B, and C. Accordingly, recommendation component 502 can associate information with the video that denotes it a suitable for other users having a profile similar to Tommy or having a profile with characteristics A, B and C. Over time, as the same video is analyzed to determine a personalized rating between the video and different user pairs, the characteristics of a generic user profile type that the video is appropriate for will be become better defined (e.g., using various machine learning models). According to this embodiment, rather than analyzing a video/potential viewer pair to determine a personalized rating for the video/potential viewer pair, recommendation component 502 can examine a profile of the potential viewer and identify those videos which have been previously determined appropriate for other users with a similar profile.

According to an embodiment, based on parental feedback of a media item from a first user (e.g., a parent) regarding appropriateness of the media item for a second user (e.g., the parent's child), personalized rating component 302 can associate a rating with the media item that reflects appropriateness of the video for the second, user, including one or more characteristics of the second user, such as the second user's age, gender, educational level, etc. Recommendation component 502 can then recommend the media item to a third user (e.g., another child) that shares similar characteristics as the second user. Recommendation component 502 can further identify other media items that were considered (based on a personalized rating), appropriate for a user having the characteristics (e.g., age, gender, educational level, etc.) of the second user and/or third user. Recommendation component 502 can also recommend these other media items to the second and third users.

In another embodiment, recommendation component 502 can analyze feedback received for a video from a plurality of different parents regarding appropriateness of the video for a plurality of different children. Recommendation component 502 can further generate groups or clusters of the feedback that are associated with children having similar profile characteristics and/or parents having similar profile characteristics. Recommendation component 502 can also identify clusters of the feedback that overlap (e.g., both the parents have similar characteristics to one another and their respective children have similar characteristics to one another). Recommendation component 502 can further direct personalized rating component 302 to determine a personalized rating for the video with respect to the different clusters based on the feedback respectively associated with the different clusters. In turn, recommendation component 502 can associate a video with different appropriateness rating for the different cluster and more specifically with characteristics of the profiles of the users (e.g., child profiles and/or parent profiles) associated with the different clusters. When recommending the video to a new user, the recommendation component 502 can determine a cluster that the new user is most similar to based on the new user's profile and the profiles of the users included in the clusters. The recommendation component 502 can then user the rating for the video associated with the cluster to determine whether to recommend the video to the new user or not.

FIG. 5 presents a diagram of another example system 500 for rating content based on parental feedback, in accordance with various aspects and embodiments described herein. System 600 includes same or similar features and functionalities as system 500 with the addition of context component 602 to parental control platform 104. Repetitive description of like elements employed in respective embodiments of systems described herein is omitted for sake of brevity.

In addition to age, educational level and other features associated with why a media item may considered appropriate or inappropriate for a particular user by a supervisor of the user (e.g., the user's parent), the context of the user can when watching the video can also play a role. For example, the appropriateness of a video can vary depending on the time of day, day of week, type of device the user is on, a location of the user, other users around the user (e.g., also watching the video), and movement of the user. For instance, a parent may restrict her child to watching more educational videos during the day and more leisurely videos at night or on weekends. Accordingly, depending on the time of day/day of week, the appropriateness rating requirement with respect to educational value of a recommended video can vary. In another instance, a parent may be more strict on the level of appropriateness of a video watched by her child when not at home while being lest strict on the level of appropriateness of videos watched by her child when at home (e.g., which can be determined by location, mobility, device at which the video is watch etc.). In yet another example, videos that are recommended to certain children on certain days of the week (e.g., religions days) can be associated with a higher appropriateness rating with respect to religion than videos that are recommended to the children on other days of the week. In another example, an appropriateness threshold for a user can vary depending on the other users around the users who are also going to be watching the recommended video. For example, a video that is appropriate for watching by a first user alone may not be appropriate for watching by the first user when accompanied by one or more other users of varying age, educational level, and/or other profile characteristics (e.g., gender, religion, culture, etc.).

Context component 602 is configured to determine one or more contextual factors associated with a user at a time when a video is to be recommended to the user for watching. For example, prior to recommending a video to a user for watching by recommendation component 502 based on a general rating or personalized rating associated therewith, context component can determine one or more of: time of day, day of week, type of device the user is on a location of the user, other users around the user (e.g., also watching the video), and movement of the user. Context component 602 can further analyze various restrictions provided by supervisors/parents of children (e.g., via their profile information) and/or by parental control platform 104 regarding appropriateness rating threshold variances under difference contexts and apply the thresholds applicable to the current contexts to determine whether a video can be recommended (e.g., via recommendation component 502).

Figure 7:
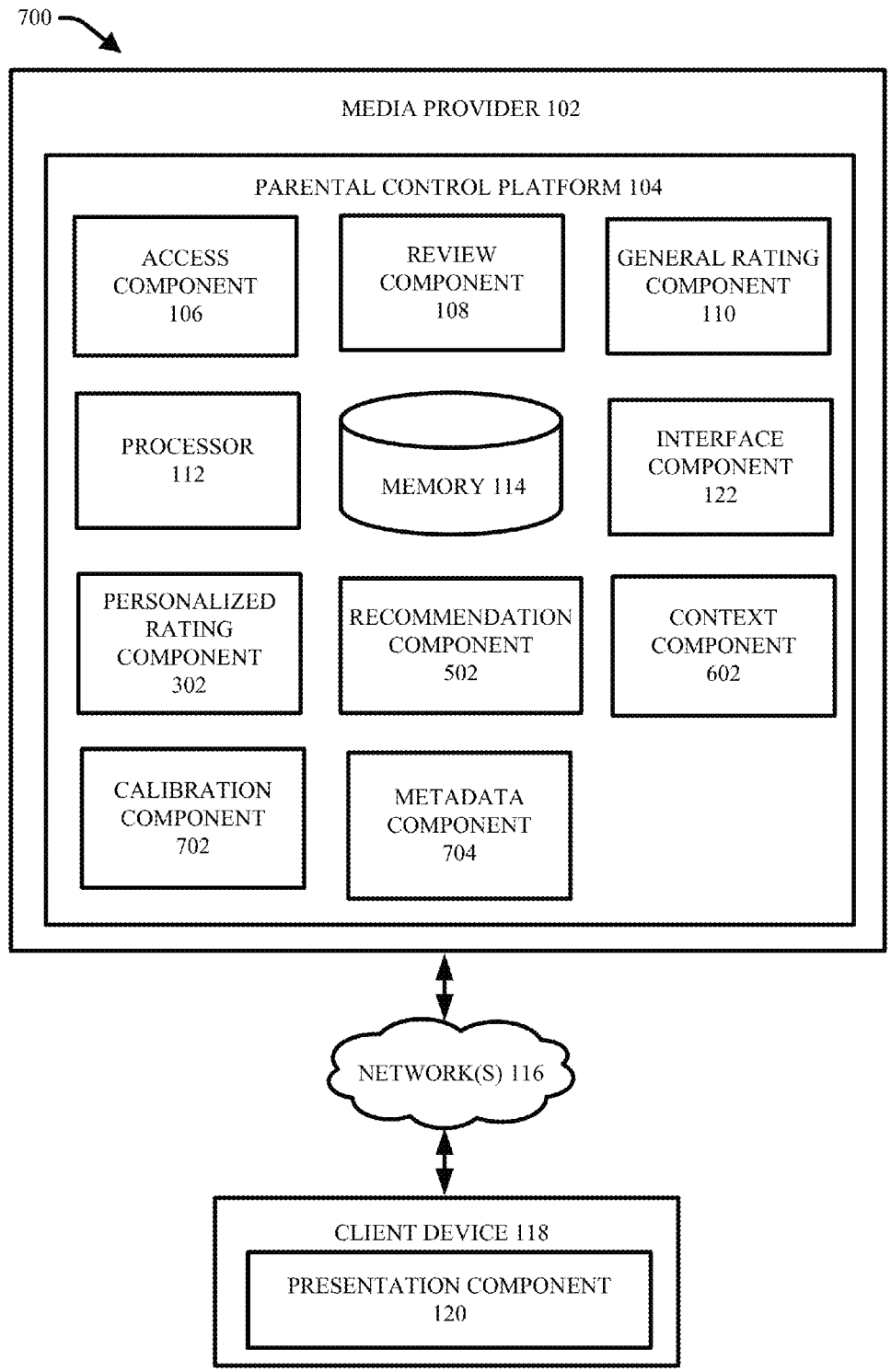
FIG. 7 illustrates another example system for rating media items based on parental feedback in accordance with various aspects and embodiments described herein.

FIG. 7 presents a diagram of another example system 700 for rating content based on parental feedback, in accordance with various aspects and embodiments described herein. System 700 includes same or similar features and functionalities as system 600 with the additions of calibration component 702 and metadata component. 704 to parental control platform 104. Repetitive description of like elements employed in respective embodiments of systems described herein is omitted for sake of brevity.

Calibration component 702 is configured to facilitate determining a more personalized rating/recommendation of a media item based on reputations and/or trust levels associated with respective reviewers providing parental feedback for which the a is based (e.g., a general age or educational level rating and/or a personalized rating). For example, the feedback of some reviewers (or parents) regarding appropriateness of a media item for another user (e.g., based on the other user's age, gender, religion, culture, educational level etc.) may be considered more credible and valuable than that of others. For instance, feedback regarding appropriateness of a video for users of a particular age range and educational level received from a grade school teacher may be more targeted than feedback received from an elder parent where the video is an educational video related to geography. Accordingly, the feedback from the grade school teach should receive greater weight than the feedback from the elder parent when determining or inferring a rating to associate with the video.

Calibration component 702 can analyze information associated with a user providing feedback related to the user's trustworthiness and/or knowledge with respect to the subject matter of a media item being reviewed. Based on the analysis, calibration component 702 can weigh or discount the user's feedback regarding appropriateness of the media item for a particular user accordingly. The weight or discount, applied to the feedback will influence or a rating applied to the media item based on the feedback by general rating component 110. In some aspects, calibration component 702 can be configured to completely disregard feedback provided by untrustworthy/credible reviewers.

In an aspect, reviewers can become associated with trust scores that represent a level of trust a community of users have in tire respective reviewers regarding their opinions of appropriateness of media, items for other users. For example, a parent that regularly provides good and accurate feedback regarding appropriateness of media items for her child may become associated with a high trust score among users that have children with similar profiles to that of her child. In another example, a parent that regularly regards videos appropriate for children of a certain age that a majority of parents would not consider appropriate for children of the certain age can be associated with a low trust score. According to this aspect, calibration component 702 can filter ratings associated, with media items based on trust information associated with the reviewers from which feedback for which the ratings are based, is received.

In various embodiments, calibration component 702 is configured to identify and score potential reviewers (e.g., parents) who are regarded as more trustworthy than others, in an aspect, calibration component 702 and/or review component 108 can allow users to rate or score one another with respect to a degree to which the respective users consider one another trustworthy or credible regarding their evaluations of appropriateness of media items. For example, a first parent can review feedback provided by another parent or a rating associated with a video based on the other parent's feedback. The first parent can further provide information (e.g., a score) that reflects a degree to which the first parent, agrees with the opinions of the second parent. This information can be employed by general rating component 110, personalized rating component 302, and calibration component 702 when rating the video and when rating other media items based on the second parents feedback.

In another aspect, parental control platform 104 can allow a user to indicate other users' from which to base ratings and/or recommendations of media items that will be presented to the user (or user associated with the user). This indication can be defined or provided in the parent's profile and/or inferred by parental control platform 104. The indication of another user to trust can include identification of a specific user (e.g., John Smith), or identification of a characteristic of associated, with user (e.g., users that belong to the same social circle as the parent/child, users belonging to the Catholic faith, users that have a college education, users whose children attend school Elite High, etc.). For example, a parent can indicate other users from which to base ratings and/or recommendations of media items that will be presented to the parent or the parent's child. According to this aspect, feedback received by users that are not indicated by the parent can be disregarded by general rating component 110, and personalized rating component 302, and recommendation component 502 when rating and/or recommending media items to the parent or parent's child.

In one or more embodiments, a group of parents can establish a circle of trust wherein the respective parents in the group provide information to parental control platform 104 that, identifies a trust relationship between the parents. The trust relationship can control what parent's feedback are considered by general rating component 110, the personalized rating component 302 and/or recommendation component 502 when rating and/or recommending media items to the children of parents in the circle. For example, a group of parents can establish a trust circle among one other based on the fact that their children attend the same school. According to this example, a parent can provide information to parental control platform for association with his or her profile that indicates only feedback from parents whose children attend school Elite High should be considered by parental control platform 104 when rating and recommending media content to the parent or the parent's child.

Parental control platform 104 can also receive and apply additional, instructions from a parent regarding what media items can be viewed by and/or recommended to the parent's child in association with feedback received by parental control platform 104. For example, a parent can authorize that her child can be recommended and/or access media items that receive a rating (e.g., by general, rating component 110) above a certain threshold. In another example, a parent can authorize that her child cart be recommended and/or access media items that receive a rating above a certain threshold from a particular user (e.g., John Smith) or user associated with a particular characteristic (e.g., a user associated with a trust score above a threshold, a user belonging to the Catholic faith, a user that has a college education, a user whose child attends school Elite High, etc,).

Metadata component 704 is configured to associate metadata with a media item based on feedback received for the media, item and/or a rating (e.g., general or personalized) for the media item. For example, metadata component 704 can associate individual scores applied to a media item by respective reviewers regarding appropriateness of the media item for another user. Metadata component 604 can also associate ratings with a media item determined by general rating component 110. In another example, metadata component 704 can associate metadata with a media item that reflects characteristics of a user profile (e.g., age, gender, religion, culture, family values, etc.) that the media item has been found (e.g., base on a plurality of personalized ratings) to be appropriate for. Metadata component 704 can also associate metadata with a media item that describes any other aspects of the media item received in association with parental feedback. For example, such information can include that describes content type, what occurs in a video or song, actors that appear in a video, a description of violence in a video, a description of vulgar language in a song, etc.

Figure 8:
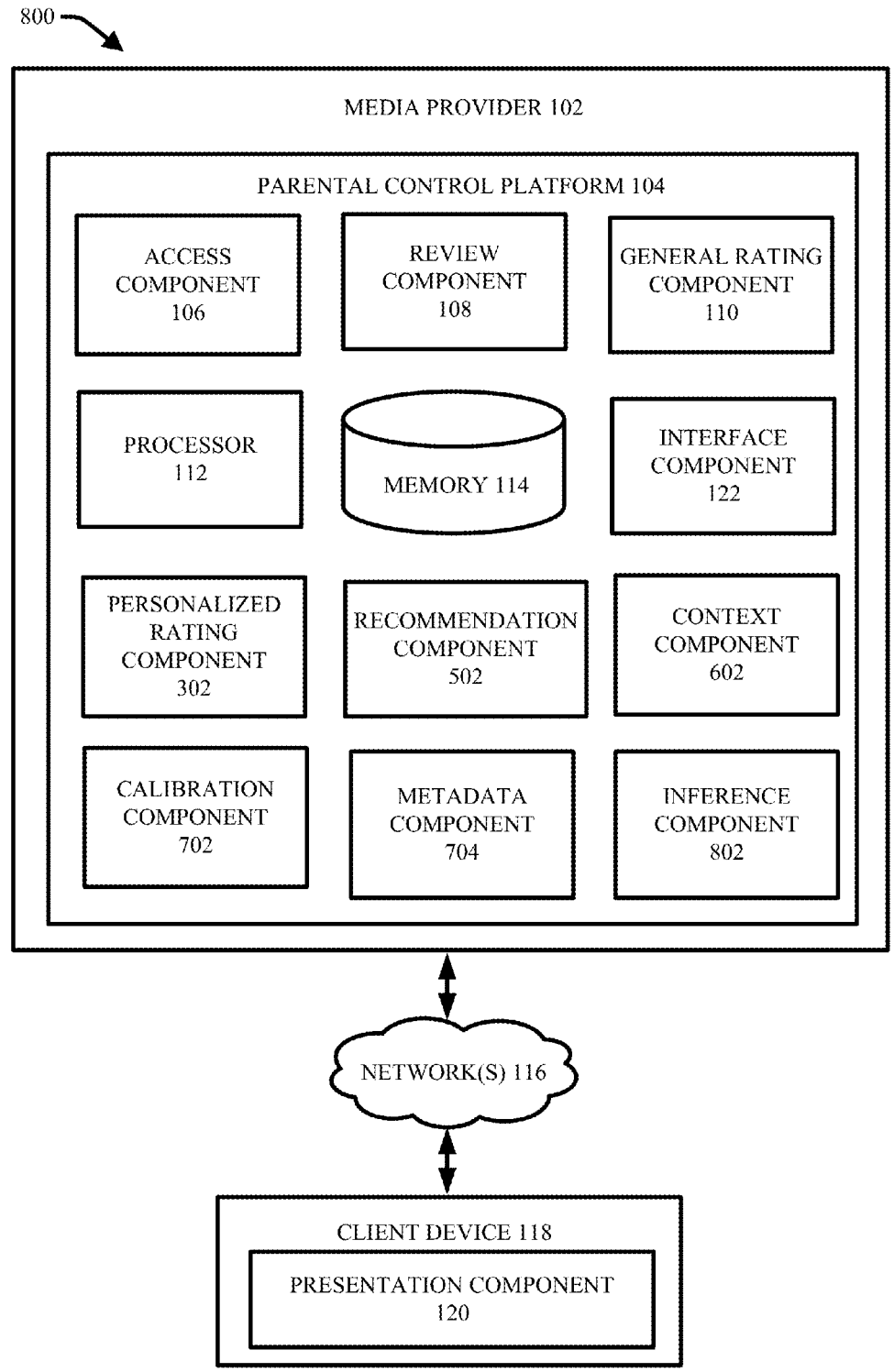
FIG. 8 illustrates another example system for rating media items based on parental feedback in accordance with various aspects and embodiments described herein.

FIG. 8 presents a diagram of another example system 800 for rating content based on parental feedback, in accordance with various aspects and embodiments described herein. System 800 includes same or similar features and functionalities as system 700 with the addition of inference component 802 to parental control platform 104. Repetitive description of like elements employed in respective embodiments of systems described herein is omitted for sake of brevity.

Inference component 802 is configured to provide for or aid in various inferences or determinations associated with aspects of parental control platform 104. For example, inference component 802 can facilitate general rating component 110 with inferring a general age or educational rating to associate with a media item based on collective parental feedback for the media item. In another example, inference component 802 can facilitate personalized rating component 302 in association with determining a personalized rating for a media item for a specific user based on a profile of the specific user, profiles of reviewers and reviewees of the media item. In another example, inference component 802 can facilitate recommendation component 502 with inferring users to recommend a media item to base on a rating associated with the media item, parental feedback regarding the media item, and/or characteristic of the users to which the media item will be recommended. In another aspect, inference component 802 can facilitate context component 602 in association with determining a context of a potential viewer of a media item and rating for the video that reflects the context. In yet another example, inference component 802 can facilitate calibration component 702 with calibrating a rating for a media item based on reputations and/or trust, levels associated with respective reviewers providing parental feedback for which the rating is based.

In aspect, all or portions of media provider 102 can be operatively coupled to inference component 802. Moreover, inference component 802 can be granted access to all or portions of remote content sources, external information sources and client devices (e.g., client device 118). In order to provide for or aid in the numerous inferences described herein, inference component 802 can examine the entirety or a subset of the data to which it is granted access and can provide for reasoning about or inter states of the system, environment, etc, from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split, the triggering criteria from the non-triggering events, intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 9:
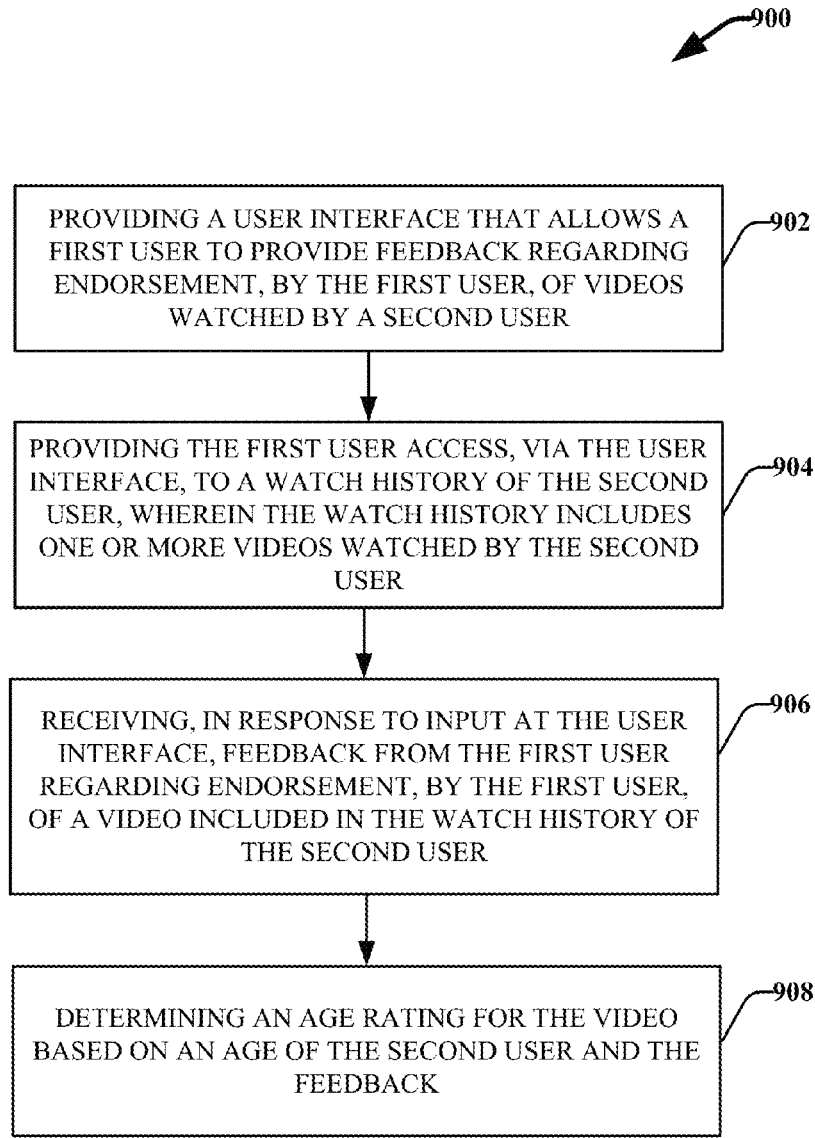
FIG. 9 is a flow diagram of an example method for rating media items based on parental feedback, in accordance with aspects described herein.
Figure 10:
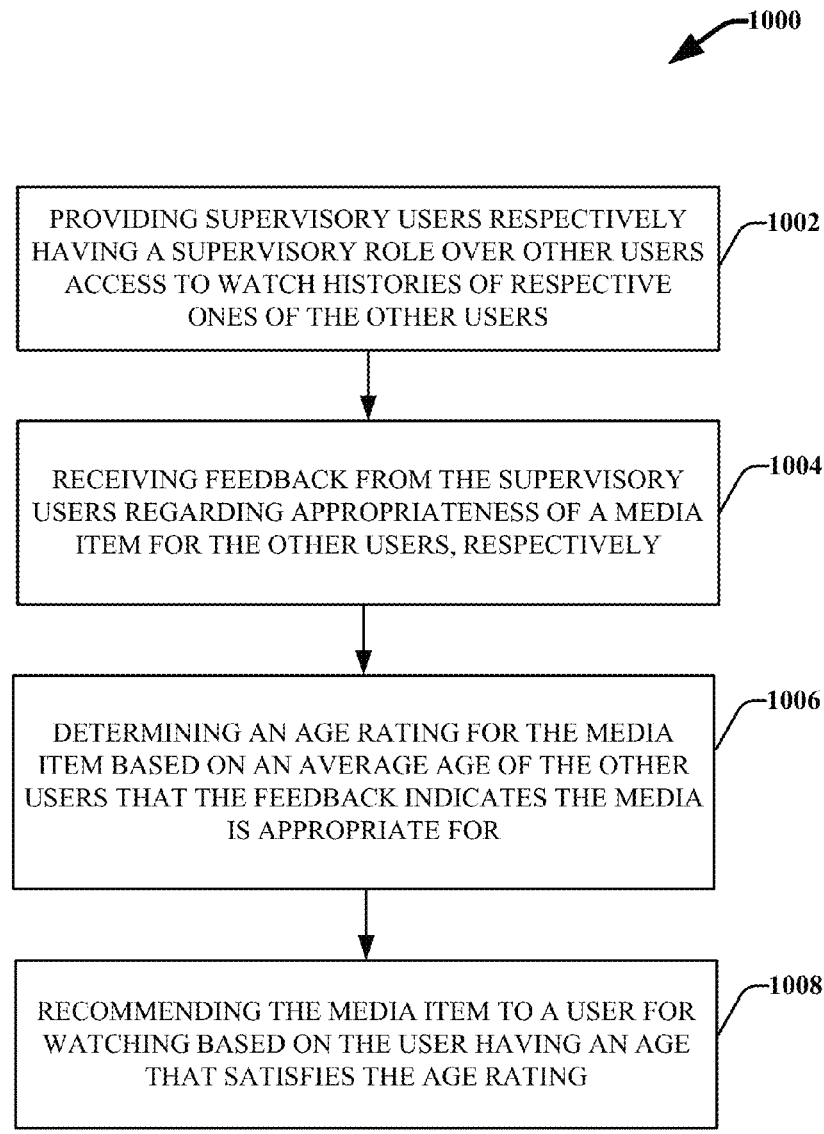
FIG. 10 is a flow diagram of another example method for rating media items based on parental feedback, in accordance with aspects described herein.
Figure 11:
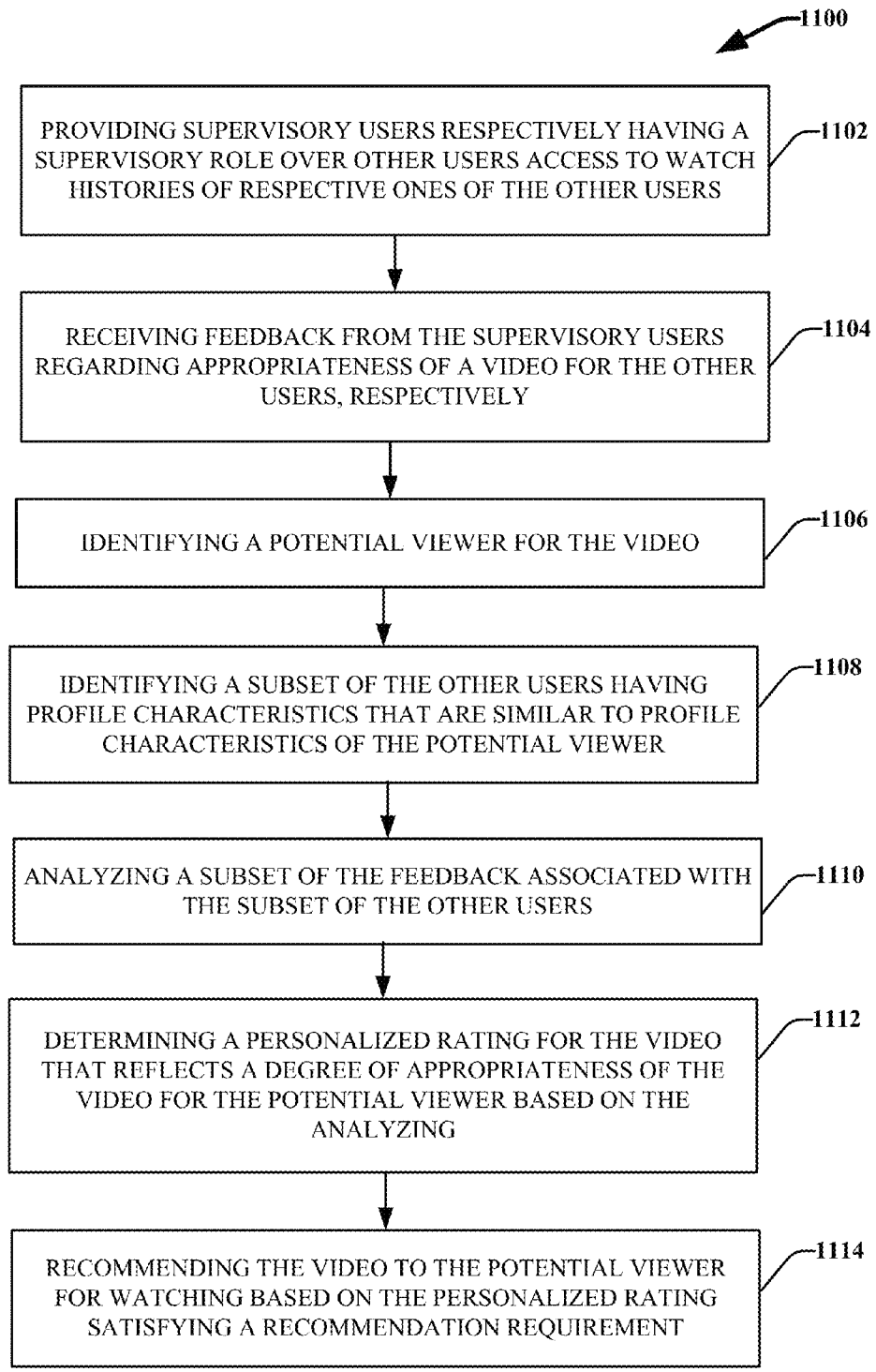
FIG. 11 is a flow diagram of another example method for rating media items based on parental feedback, in accordance with aspects described herein.

In view of the example systems and/or devices described herein, example methods that can be implemented in accordance with the disclosed subject matter can be further appreciated with reference to flowcharts in FIGS. 9-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 9 illustrates a flow chart of an example method 900 for rating media based on parental feedback, in accordance with various aspects find embodiments described herein. At 902, a user interface is provided to a first user that allows a first user to provide feedback regarding endorsement, by the first user, of videos watched by a second user (e.g., via interface component 122). At 904, providing the first user access, via the user interlace, to a watch history of the second user, wherein the watch history includes one or more videos watched by the second user (e.g., via access component 106). At 906, in response to input at the user interlace, feedback is received from the first user regarding endorsement, by the first user, of a video included in the watch history of the second user (e.g., via review component 108). For example, a parent can review a video watched by her child and rate the video for appropriateness for her child in view of an amount of violence, profanity, or vulgarity associated with the video, in another example, a parent can re view an educational video watched by her child and rate the video for appropriateness of her child with respect to a difficulty level of the content of the video.

At 908, an age rating for the video is determined based on an age of the second user and the feedback, (e.g., via general rating component 110). For example, based on the first users feedback and feedback regarding appropriateness of the video for their respective children received from other users, a rating can be associated with the video that reflects the collective opinions of the users providing feedback. For example, the rating can indicate the video is appropriate for children of a specific age (e.g., 5) or age range (e.g., 3-5), as opposed to a general rating of G, PG, PG-13, R, etc.).

FIG. 10 illustrates a flow chart of another example method 1000 for rating content based on parental feedback, in accordance with various aspects and embodiments described herein. At 1002, supervisory users respectively having a supervisory role over other users are provided with access to watch histories of respective ones of the other users; (e.g., via access component 106). For example, parents can be provided access to watch histories and other media interaction activity (e.g., videos saved for watching, video recommended for watching, etc.) of the children at a media provider (e.g., media provider 102). At 1004, feedback is received from the supervisory users regarding appropriateness of a media item for the other users, respectively (e.g., via review component 108). For example, parents of different children can provide feedback regarding their opinions of appropriateness of a same for their children that was respectively watched by their children. The children can vary in age, educational level, and a variety of different characteristics (e.g., gender, culture, language, ethnicity, religion, etc.). At 1006, an age rating is determined for the media item based on an average age of the other users that the feedback indicates the video is appropriate for (e.g., via general rating component 110). At 1008, the media item is recommended to a user for watching based on the user having an age that satisfies the age rating (e.g., via recommendation component 502).

FIG. 11 illustrates a flow chart of another example method 1100 for rating content based on parental feedback, in accordance with various aspects and embodiments described herein. At 1102, supervisory users respectively having a supervisory role over other users are provided with access to watch histories of respective ones of the other users; (e.g., via access component 106). For example, parents can be provided access to watch histories and other media interaction activity (e.g., videos saved for watching, video recommended for watching, etc.) of the children at a media provider (e.g., media provider 102). At 1104, feedback is received from the supervisory users regarding appropriateness of a video for the other users, respectively (e.g., via review component 108). For example, parents of different children can provide feedback regarding their opinions of appropriateness of a same for their children that was respectively watched by their children. The children can vary in age, educational level, and a variety of different characteristics (e.g., gender, culture, language, ethnicity, religion, etc.).

At 1106, a potential viewer for the video is identified (e.g., via recommendation component 502). For example, a video to whom the video might be recommended or hypothetical view having a certain profile can be identified. At 1108, a subset of the other users having profile characteristics that are similar to profile characteristics of the potential, viewer are identified (e.g., via recommendation component 502). For example, other children having profile characteristics (e.g., age, education level, gender, religion, culture, etc.) similar to profile characteristics of the potential viewer can be identified. At 1110, a subset of the feedback associate with the subset of the other users is analyzed, and at 1112, a personalized rating is determined for the video that reflects a degree of appropriateness of the video for the potential viewer (e.g., via personalized rating component 302). At 1114, the video is then recommended to the potential viewer for watching based on the personalized rating satisfying a recommendation requirement (e.g., via recommendation component 502). For example, the recommendation requirement can include a particular rating value or a minimum rating score.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 12:
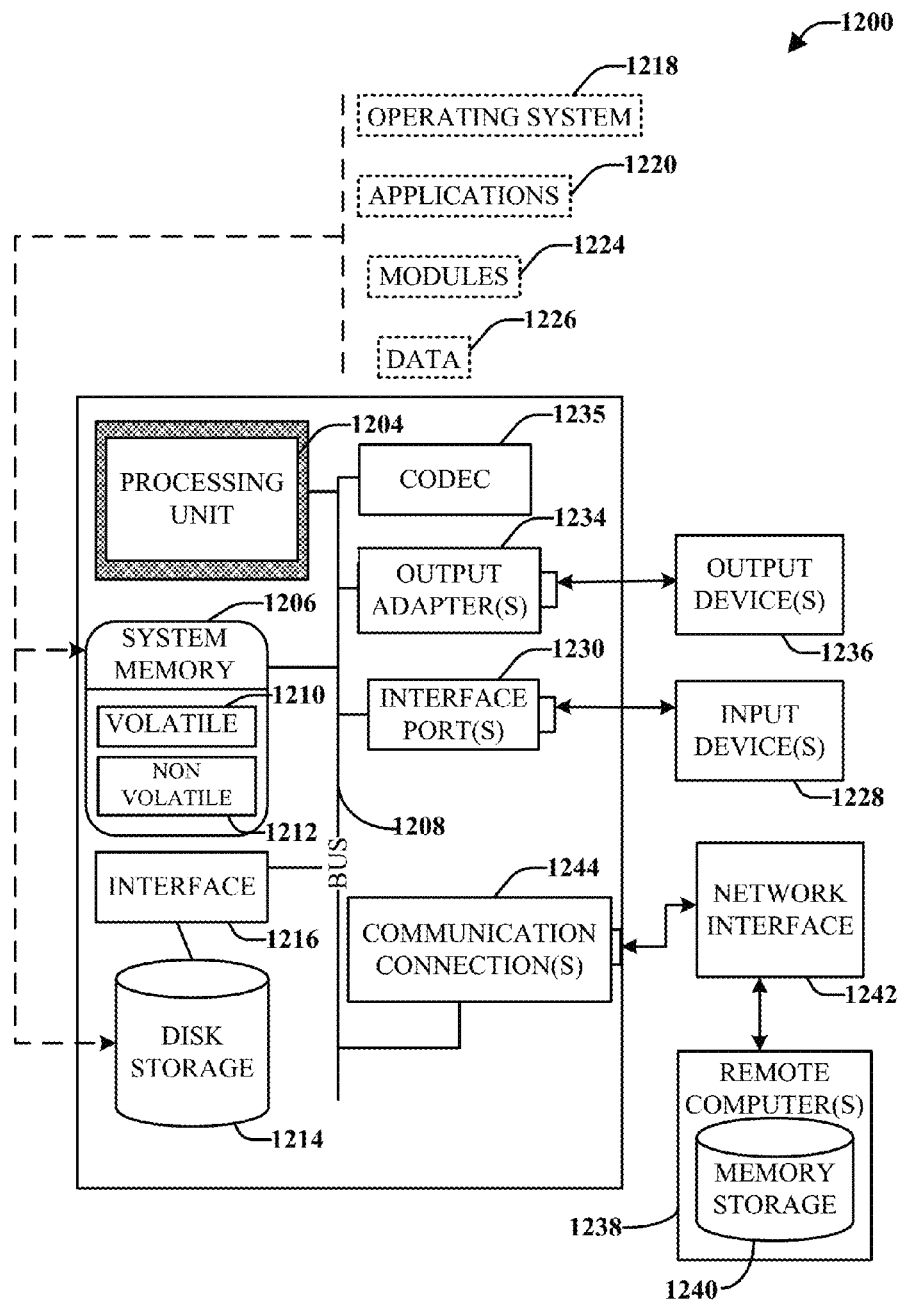
FIG. 12 is a schematic block diagram illustrating a suitable operating environment in accordance with various aspects and embodiments.

With reference to FIG. 12, a suitable environment 1200 for implementing various aspects of the claimed subject matter includes a computer 1202. The computer 1202 includes a processing unit 1204, a system memory 1206, a codec 1205, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13124), and Small Computer Systems Interlace (SCSI).

The system memory 1206 includes volatile memory 1210 and non-volatile memory 1212. The basic input/output system (BIOS), containing the baste routines to transfer information between elements within the computer 1202, such as during start-up, is stored in non-volatile memory 1212. In addition, according to present innovations, codec 1205 may include at least one of an encoder or decoder, wherein the at least one of an encoder or decoder may consist of hardware, a combination of hardware and software, or software. Although, codec 1205 is depicted as a separate component, codec 1205 may be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), or flash memory. Volatile memory 1210 includes random access memory (RAM), which acts as external cache memory. According to present aspects, the volatile memory may store the write operation retry logic (not shown in FIG. 12) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1202 may also include removable/non-removable, volatile/non-volatile computer storage medium. FIG. 12 illustrates, for example, disk storage 1214. Disk storage 1214 includes, but is not limited to, devices like a magnetic disk drive, solid stale disk (SSD) floppy disk drive, tape drive, Jaz drive, Zip drive, LS-70 drive, flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1214 to the system bus 1208, a removable or non-removable interlace is typically used, such as interlace 1216.

It is to be appreciated that FIG. 12 describes software that acts as an intermediary between, users and the basic computer resources described in the suitable operating environment 1200. Such software includes an operating system 1218. Operating system 1218, which can be stored on disk storage 1214, acts to control and allocate resources of the computer system 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228, Input devices 1228 include, but are not limited to, a pointing device such as a mouse, trackball, stylus, touch pad, keyboard, microphone, joystick, game pad, satellite dish, scanner, TV timer card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s). Thus, for example, a USB port may be used to provide input to computer 1202, and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output, device 1236 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244, Network interface 1242 encompasses wire and/or wireless communication networks such as local-area networks (LAN) and wide-area networks (WAN) and cellular networks, LAN technologies include Fiber Distributed Data Interface (FDDI), Copper Distributed Data Interlace (CDDI). Ethernet, Token Ring and the like, WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

Figure 13:
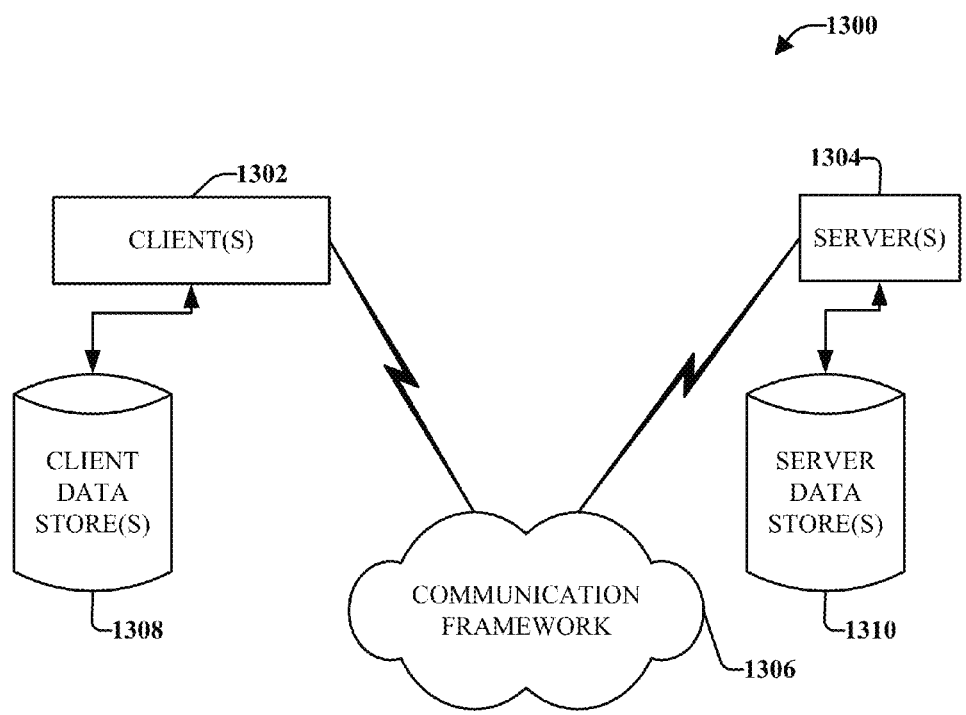
FIG. 13 is a schematic block diagram of a sample-computing environment in accordance with various aspects and embodiments.

Referring now to FIG. 13, there is illustrated a schematic block diagram of a computing environment 1300 in accordance with this disclosure. The system 1300 includes one or more client(s) 1302 (e.g., laptops, smart phones, PDAs, media players, computers, portable electronic devices, tablets, and the like). The client(s) 1302 can be hardware and/or software (e.g., threads, processes, computing devices). The system 1300 also includes one or more servers) 1304. The server(s) 1304 can also be hardware or hardware in combination with software (e.g., threads, processes, computing devices). The servers 1304 can house threads to perform transformations by employing aspects of this disclosure, for example. One possible communication between a client 1302 and a server 1304 can be in the form of a data packet transmitted between two or more computer processes wherein the data packet may include video data. The data packet can include a metadata, e.g., associated contextual information, for example. The system 1300 includes a communication framework 1306 (e.g., a global communication network such as the Internet, or mobile network(s)) that can be employed to facilitate communications between the client(s) 1302 and the server(s) 1304.

Communications can be facilitated via a wired (including optical fiber) and/or wireless technology. The clients) 1302 include or are operatively connected to one or more client data store(s) 1308 that can be employed to store information local to the client(s) 1302 (e.g., associated contextual information). Similarly, the server(s) 1304 are operatively include or are operatively connected to one or more server data store(s) 1310 that can be employed to store information local to the servers 1304.

In one embodiment, a client 1302 can transfer an encoded file, in accordance with the disclosed subject matter, to server 1304. Server 1304 can store the file, decode the file, or transmit the file to another client 1302. It is to be appreciated, that a client 1302 can also transfer uncompressed file to a server 1304 and server 1304 can compress the file in accordance with the disclosed subject matter. Likewise, server 1304 can encode video information and transmit the information via communication framework 1306 to one or more clients 1302.

The illustrated aspects of the disclosure may also be practiced in distributed computing environments where certain tasks are performed by remote processing devices that are linked through a communications network, in a distributed computing environment, program modules can be located in both local and remote memory storage devices.

Moreover, it is to be appreciated that various components described in this description can include electrical circuits) that can include components and circuitry elements of suitable value in older to implement the embodiments of the subject innovation(s). Furthermore, if can be appreciated that many of the various components can be implemented on one or more integrated circuit (IC) chips. For example, in one embodiment, a set of components can be implemented in a single IC chip, in other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/ circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or art entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear front context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EE PROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described, subject, matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method comprising:
using, a media provider device that receives a signal over a network and a processor to execute the following computer executable instructions stored in a memory to perform the following acts:
providing a user interface that allows a first user to provide feedback regarding videos watched by a second user;
providing the first user access, via the user interface, to a watch history of the second user, wherein the watch history includes one or more videos watched by the second user:
receiving, in response to input at the user interface, feedback from the first user regarding a video included in the watch history of the second user, the feedback based at least in part on an educational level of the second user and indicating whether the videos are appropriate for viewing by the second user;
inferring an age appropriateness rating and an educational appropriateness rating to associate with the video based on the feedback received from the first user via the user interface; and
recommending additional media items for viewing by the second user, the recommendation determined according to the feedback received from the first user and an education appropriateness rating associated with the media items to be recommended.

2. The method of claim 1, further comprising: recommending the video to a third user for watching based on the age appropriateness rating and an age of the third user.

3. The method of claim 1, further comprising: determining a personalized rating for the video that reflects a degree of appropriateness of the video for viewing by a third user based on the feedback, a profile of the third user, and a profile of the second user; and recommending the video to the third user in response to the personalized rating being greater than or equal to a threshold rating.

4. The method of claim 3, wherein the profile of the third user and the profile of the second user includes information identifying at least one of: user gender, user ethnicity, user culture, user religion, or user geographic location.

5. The method of claim 1, further comprising:
determining a personalized rating for the video that reflects a degree of appropriateness of the video for viewing by a third user based on the feedback, a profile of the third user, a profile of the second user, a profile of the first user and a profile of a fourth user having a supervisory role over the third user; and
recommending the video to the third user in response to the personalized rating being greater than or equal to a threshold rating.

6. A non-transitory computer-readable storage medium comprising computer-readable instructions that, in response to execution, cause a computing system to perform operations, comprising:
providing a user interface that allows, a first user to provide feedback regarding videos watched by a second user;
providing the first user access, via the user interface, to a watch history of the second user, wherein the watch history includes one or more videos watched by the second user,
receiving, in response to input at the user interface, feedback from the first user regarding a video included in the watch history of the second user, the feedback based at least in part on an educational level of the second user and indicating whether the videos are appropriate for viewing by the second user;
inferring an age appropriateness rating and an educational appropriateness rating to associate with the video based on the feedback received from the first user via the user interface: and
recommending additional media items for viewing by the second user, the recommendation determined according to the feedback received from the first user and an education appropriateness rating associated with the media items to be recommended.

7. The non-transitory computer-readable storage medium of claim 6, the operations further comprising:
determining a personalized rating for the video that reflects a degree of appropriateness of the video for viewing by a third user based on the feedback, a profile of the third user, a profile of the second user, a profile of the first user and a profile of a fourth user having a supervisory role over the third user; and
recommending the video to the third user in response to the personalized rating being greater than or equal to a threshold rating.

8. The non-transitory computer-readable storage medium of claim 6, the operations further comprising:
recommending the video to a third user for watching based on the age appropriateness rating and an age of the third user.

9. The non-transitory computer-readable storage medium of claim 6, the operations further comprising:
determining a personalized rating for the video that reflects a degree of appropriateness of the video for viewing by a third user based on the feedback, a profile of the third user, and a profile of the second user; and
recommending the video to the third user in response to the personalized rating being greater than or equal to a threshold rating.

10. The non-transitory computer-readable storage medium of claim 9, wherein the profile of the third user and the profile of the second user includes information identifying at least one of: user gender, user ethnicity, user culture, user religion, or user geographic location.

11. A media provider device that receives a signal over a network comprising:
a memory; and
a processor operatively coupled to the memory to:

provide a user interface that allows a first user to provide feedback regarding videos watched by a second user;

provide the first user access, via the user interface, to a watch history of the second user, wherein the watch history includes one or more videos watched by the second user;

receive, in response to input at the user interface, feedback from the first user regarding a video included in the watch history of the second user, the feedback based at least in part on an educational level of the second user and indicating whether the videos are appropriate for viewing by the second user;

infer an age appropriateness rating and an educational appropriateness rating to associate with the video based on the feedback received from the first user via the user interface; and recommend additional media items for viewing by the second user, the recommendation determined according to the feedback received from the first user and an education appropriateness rating associated with the media items to be recommended.

12. The media provider device of claim 11, wherein the processor is further to:

recommend the video to a third user for watching based on the age appropriateness rating and an age of the third user.

13. The media provider device of claim 11, wherein the processor is further to:

determine a personalized rating for the video that reflects a degree of appropriateness of the video for viewing by a third user based on the feedback, a profile of the third user, and a profile of the second user; and recommending the video to the third user in response to the personalized rating being greater than or equal to a threshold rating.

14. The media provider device of claim 13, wherein the profile of the third user and the profile of the second user includes information identifying at least one of: user gender, user ethnicity, user culture, user religion, or user geographic location.

15. The media provider device of claim 11, wherein the processor is further to:

determine a personalized rating for the video that reflects a degree of appropriateness of the video for viewing by a third user based on the feedback, a profile of the third user, a profile of the second user, a profile of the first user and a profile of a fourth user having a supervisory role over the third user; and recommend the video to the third user in response to the personalized rating being greater than or equal to a threshold rating.

* * * * *